(12) United States Patent
Yan et al.

(10) Patent No.: US 11,474,329 B2
(45) Date of Patent: Oct. 18, 2022

(54) CAMERA OPTICAL LENS

(71) Applicant: AAC Optics Solutions Pte. Ltd., Singapore (SG)

(72) Inventors: Junjie Yan, Shenzhen (CN); Wen Sun, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 290 days.

(21) Appl. No.: 16/989,925

(22) Filed: Aug. 11, 2020

(65) Prior Publication Data
US 2021/0055520 A1 Feb. 25, 2021

(30) Foreign Application Priority Data
Aug. 19, 2019 (CN) .......................... 201910765461.0

(51) Int. Cl.
*G02B 9/60* (2006.01)
*G02B 13/00* (2006.01)
*G02B 7/02* (2021.01)
*G02B 13/18* (2006.01)
*G02B 27/00* (2006.01)
*G02B 5/00* (2006.01)

(52) U.S. Cl.
CPC ......... *G02B 13/0045* (2013.01); *G02B 7/021* (2013.01); *G02B 13/18* (2013.01); *G02B 27/0025* (2013.01); *G02B 5/005* (2013.01); *G02B 9/60* (2013.01)

(58) Field of Classification Search
CPC ............... G02B 13/0045; G02B 7/021; G02B 27/0025; G02B 13/18; G02B 5/005; G02B 9/60

USPC ............... 359/708, 713, 739, 740, 754, 755
See application file for complete search history.

(56) References Cited

U.S. PATENT DOCUMENTS

| 4,217,034 | A *  | 8/1980 | Sugiyama .............. | G02B 13/04 359/754 |
| 9,030,757 | B2 * | 5/2015 | Kawamura ............ | G02B 13/04 359/708 |
| 10,330,892 | B2 * | 6/2019 | Hashimoto ........ | G02B 13/0045 |
| 10,705,319 | B2 * | 7/2020 | Jhang ...................... | G02B 9/64 |
| 10,725,269 | B2 * | 7/2020 | Hsieh ...................... | G02B 9/64 |
| 10,746,971 | B2 * | 8/2020 | Hashimoto ............. | G02B 9/64 |
| 11,340,430 | B2 * | 5/2022 | Chen .................. | G02B 13/0045 |
| 11,372,210 | B2 * | 6/2022 | Jhang ...................... | G02B 9/64 |

(Continued)

FOREIGN PATENT DOCUMENTS

CN 110687659 B * 4/2022 ............. G02B 13/18

*Primary Examiner* — Evelyn A Lester
(74) *Attorney, Agent, or Firm* — W&G Law Group

(57) ABSTRACT

The present invention provides a camera optical lens including, from an object side to an image side, a first lens, a second lens, a third lens, a third lens, a fourth lens, a fifth lens, a sixth lens, a seventh lens and a eighth lens. The first, third, fifth and seventh lens have positive refractive power, while the second, fourth, sixth and eighth lens have negative refractive power. The camera optical lens satisfies the following conditions: $0.70 \leq f1/f \leq 1.00$; $-20.00 \leq f4/f \leq 3.50$; and $2.30 \leq f5/f \leq 4.50$; where f denotes a focal length of the camera optical lens, and f1, f4 and f5 respectively denote a focal length of the first lens, the fourth lens and the fifth lens. The camera optical lens in the present disclosure satisfies a design requirement of large aperture, wide angle and ultra-thinness while having good optical functions.

11 Claims, 9 Drawing Sheets

(56) References Cited

U.S. PATENT DOCUMENTS

| | | | |
|---|---|---|---|
| 2013/0271851 A1* | 10/2013 | Souma | G02B 3/04 359/708 |
| 2014/0240851 A1* | 8/2014 | Kawamura | G02B 9/64 359/708 |
| 2014/0268367 A1* | 9/2014 | Kawamura | G02B 13/18 359/708 |
| 2018/0074299 A1* | 3/2018 | Huang | G02B 13/0045 |
| 2019/0121098 A1* | 4/2019 | Zhou | G02B 13/0045 |
| 2019/0204558 A1* | 7/2019 | Jhang | G02B 13/0045 |
| 2019/0204559 A1* | 7/2019 | Jhang | G02B 13/06 |
| 2019/0204560 A1* | 7/2019 | Jhang | G02B 9/64 |
| 2019/0310444 A1* | 10/2019 | Hashimoto | G02B 13/0045 |
| 2019/0310445 A1* | 10/2019 | Hashimoto | G02B 13/0045 |
| 2019/0310446 A1* | 10/2019 | Hashimoto | G02B 13/0045 |
| 2019/0310447 A1* | 10/2019 | Hashimoto | G02B 9/64 |
| 2019/0310448 A1* | 10/2019 | Hashimoto | G02B 13/0045 |
| 2020/0110247 A1* | 4/2020 | Jhang | G02B 13/18 |
| 2020/0174227 A1* | 6/2020 | Nitta | G02B 13/0045 |
| 2020/0249439 A1* | 8/2020 | Song | G02B 27/0025 |

\* cited by examiner

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

With the continuous development of science and technology, the functions of electronic devices are constantly improving. In addition to traditional digital cameras, independent cameras, monitors and the like, portable electronic devices such as tablet computers and mobile phones are also equipped with camera optical lenses, and the lenses in electronic devices such as mobile phones are required to meet the requirements of lightness and thinness while having good imaging quality. Therefore, miniature camera lens with good imaging quality have become a mainstream in the market.

In order to obtain better imaging quality, the lens that is traditionally equipped in mobile phone cameras adopts a four-piece, five-piece or six-piece lens structure. However, with the development of technology and the increase of the diverse demands of users, and as the pixel area of photosensitive devices is becoming smaller and smaller and the requirement of the system on the imaging quality is improving constantly, the eight-piece lens structure gradually appear in lens designs. Although the common eight-piece lens has good optical functions, the lens is fairly unreasonable in terms of setting of optical focal degree, lens spacing and lens shape, rendering that the lens structure with good optical functions can not satisfy a design requirement of large aperture, ultra-thinness and wide angle.

Therefore, it is necessary to provide a camera optical lens to solve the above issues.

SUMMARY

The present disclosure seeks to provide a camera optical lens to solve the technical problem that the camera optical lens cannot satisfy a design requirement of large aperture, wide angle and ultra-thinness while having good optical functions.

The technical solutions of the present disclosure are as follows:

A camera optical lens comprising, from an object side to an image side: a first lens having a positive refractive power; a second lens having a negative refractive power; a third lens having a positive refractive power; a fourth lens having a negative refractive power; a fifth lens having a positive refractive power; a sixth lens having a negative refractive power; a seventh lens having a positive refractive power; and a eighth lens having a negative refractive power; wherein the camera optical lens satisfies following conditions:

$0.70 \leq f1/f \leq 1.00$;

$-20.00 \leq f4/f \leq -3.50$; and $2.30 \leq f5/f \leq 4.50$;

where f denotes a focal length of the camera optical lens; f1 denotes a focal length of the first lens; f4 denotes a focal length of the fourth lens; and f5 denotes a focal length of the fifth lens.

As an improvement, the camera optical lens further satisfies the following condition:

$(R11+R12)/(R11-R12) \leq -1.00$;

where R11 denotes a curvature radius of an object-side surface of the sixth lens; and R12 denotes a curvature radius of an image-side surface of the sixth lens.

As an improvement, the camera optical lens further satisfies the following condition:

$1.50 \leq d10/d9 \leq 3.30$;

where d9 denotes an on-axis thickness of the fifth lens; and d10 denotes an on-axis distance from an image-side surface of the fifth lens to an object-side surface of the sixth lens.

As an improvement, the camera optical lens further satisfies the following conditions:

$0.06 \leq d1/TTL \leq 0.24$; and $-0.50 \leq (R1+R2)/(R1-R2) \leq -0.93$;

where TTL denotes a total optical length from an object-side surface of the first lens to an image surface of the camera optical lens along an optical axis; d1 denotes an on-axis thickness of the first lens; R1 denotes a curvature radius of an object-side surface of the first lens; and R2 denotes a curvature radius of an image-side surface of the first lens.

As an improvement, the camera optical lens further satisfies the following conditions:

$0.01 \leq d3/TTL \leq 0.05$;

$-6.75 \leq f2/f \leq -0.93$; and $0.96 \leq (R3+R4)/(R3-R4) \leq 7.82$;

where f2 denotes a focal length of the second lens; TTL denotes a total optical length from an object-side surface of the first lens to an image surface of the camera optical lens along an optical axis; d3 denotes an on-axis thickness of the second lens; R3 denotes a curvature radius of an object-side surface of the second lens; and R4 denotes a curvature radius of an image-side surface of the second lens.

As an improvement, the camera optical lens further satisfies the following conditions:

$0.02 \leq d5/TTL \leq 0.07$;

$1.75 \leq f3/f \leq 60.76$; and $-21.79 \leq (R5+R6)/(R5-R6) \leq 7.89$;

where f3 denotes a focal length of the third lens; TTL denotes a total optical length from an object-side surface of the first lens to an image surface of the camera optical lens along an optical axis; d5 denotes an on-axis thickness of the third lens; R5 denotes a curvature radius of an object-side surface of the third lens; and R6 denotes a curvature radius of an image-side surface of the third lens.

As an improvement, the camera optical lens further satisfies the following conditions:

$0.01 \leq d7/TTL \leq 0.07$; and $-2.17 \leq (R7+R8)/(R7-R8) \leq 16.70$;

where TTL denotes a total optical length from an object-side surface of the first lens to an image surface of the camera optical lens along an optical axis; d7 denotes an on-axis thickness of the fourth lens; R7 denotes a curvature radius of an object-side surface of the fourth lens; and R8 denotes a curvature radius of an image-side surface of the fourth lens.

As an improvement, the camera optical lens further satisfies the following conditions:

$$0.02 \leq d9/TTL \leq 0.07; \text{ and}$$

$$-5.65 \leq (R9+R10)/(R9-R10) \leq 0.93;$$

where TTL denotes a total optical length from an object-side surface of the first lens to an image surface of the camera optical lens along an optical axis; d9 denotes an on-axis thickness of the fifth lens; R9 denotes a curvature radius of an object-side surface of the fifth lens; and R10 denotes a curvature radius of an image-side surface of the fifth lens.

As an improvement, the camera optical lens further satisfies the following conditions:

$$0.02 \leq d11/TTL \leq 0.08; \text{ and}$$

$$-824.15 \leq f6/f \leq -1.62;$$

where f6 denotes a focal length of the sixth lens; TTL denotes a total optical length from an object-side surface of the first lens to an image surface of the camera optical lens along an optical axis; d11 denotes an on-axis thickness of the sixth lens.

As an improvement, the camera optical lens further satisfies the following conditions:

$$0.03 \leq d13/TTL \leq 0.11;$$

$$-0.66 \leq f7/f \leq 4.79; \text{ and}$$

$$-20.65 \leq (R13+R14)/(R13-R14) \leq -2.69;$$

where f7 denotes a focal length of the seventh lens; TTL denotes a total optical length from an object-side surface of the first lens to an image surface of the camera optical lens along an optical axis; d13 denotes an on-axis thickness of the seventh lens; R13 denotes a curvature radius of an object-side surface of the sixth lens; and R14 denotes a curvature radius of an image-side surface of the sixth lens.

As an improvement, the camera optical lens further satisfies the following conditions:

$$0.02 \leq d15/TTL \leq 0.13;$$

$$-1.69 \leq f8/f \leq -0.52; \text{ and}$$

$$-0.97 \leq (R15+R16)/(R15-R16) \leq -0.21;$$

where f8 denotes a focal length of the eighth lens; d15 denotes an on-axis thickness of the eighth lens; R15 denotes a curvature radius of an object-side surface of the eighth lens; and R16 denotes a curvature radius of an image-side surface of the eighth lens.

The present disclosure is advantageous in: through the above lens configuration, the camera optical lens in the present disclosure has good optical functions and has characteristics of large aperture, wide angle and ultra-thinness, and is especially fit for WEB camera lenses and mobile phone camera lens assemblies composed by such camera elements as CCD and CMOS for high pixels.

DETAILED DESCRIPTION OF EMBODIMENTS

The present disclosure will be further illustrated with reference to the accompanying drawings and embodiments.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
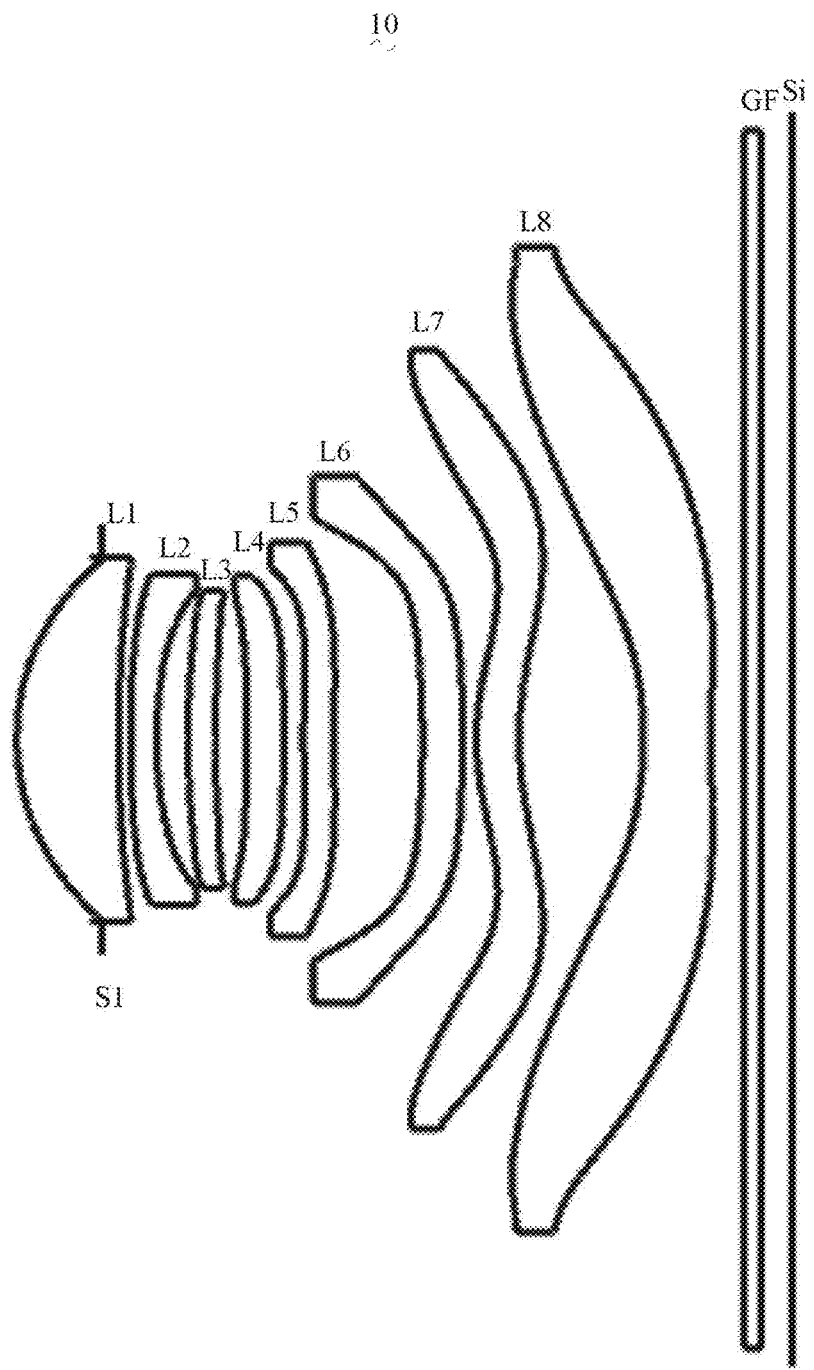
FIG. 1 is a schematic diagram of a structure of a camera optical lens according to Embodiment 1 of the present disclosure.

Referring to FIGS. 1 to 4 together, the present disclosure provides a camera optical lens 10 of Embodiment 1. FIG. 1 shows the camera optical lens 10 of Embodiment 1 of the present disclosure, and the camera optical lens 10 includes eight lenses. Specifically, the camera optical lens 10 includes, from an object side to an image side: an aperture S1, a first lens L1, a second lens L2, a third lens L3, a fourth lens L4, a fifth lens L5, a sixth lens L6, a seventh lens L7 and a eighth lens L8. In this embodiment, an optical element such as an optical filter GF is arranged between the eighth lens L8 and an image surface Si. Herein, the optical filter GF may either be a glass cover plate or be an optical filter. Alternatively, the optical filter GF may further be arranged at another position in another embodiment.

In this embodiment, the first lens L1 has a positive refractive power, the second lens L2 has a negative refractive power, the third lens L3 has a positive refractive power, the fourth lens L1 has a negative refractive power, the fifth lens L5 has a positive refractive power, the sixth lens L6 has a negative refractive, the seventh lens L7 has a positive refractive power and the eighth lens has a negative refractive power.

In this embodiment, a focal length of the camera optical lens 10 is defined as f, a focal length of the first lens L1 is defined as f, and the camera optical lens 10 satisfies the condition: $0.70 \leq f1/f \leq 1.00$. The condition specifies a ratio between the focal length of the first lens L1 and the focal length of the camera optical lens 10, within a range of which it helps correct the spherical aberration of the camera optical lens and improves imaging quality.

The focal length of the camera optical lens 10 is defined as f, a focal length of the first lens L4 is defined as f4, and the camera optical lens 10 satisfies the condition: $-20.00 \leq f4/f \leq -3.50$. The condition specifies a ratio between the focal length of the fourth lens L4 and the focal length of the camera optical lens 10, within a range of which it helps improve functions of the camera optical lens.

The focal length of the camera optical lens 10 is defined as f, a focal length of the fifth lens L5 is defined as f5, and the camera optical lens 10 satisfies the condition: $2.30 \leq f5/f \leq 4.50$. The condition specifies a ratio between the focal length of the fifth lens L5 and the focal length of the camera optical lens 10, within a range of which, the focal length of the fifth lens can be effectively allocated, thereby helping compress a total optical length from an object side lens of the camera optical lens to an image plane of the camera optical lens 10.

A curvature radius of an object-side surface of the sixth lens L6 is defined as R11, a curvature radius of an image-side surface of the sixth lens L6 is defined as R12, and the camera optical lens 10 satisfies the condition: $(R11+R12)/(R11-R12) \leq -1.00$. The condition specifies a ratio between a sum of the curvature radius of the object-side surface and the curvature radius of the image-side surface of the sixth lens L6 and a difference between the curvature radius of the object-side surface and the curvature radius of the image-side surface of the sixth lens L6, thereby specifying a shape of the sixth lens L6. Within a range specified by the condition, a deflection degree of a light passing through the lens can be alleviated and the aberration can be effectively reduced.

An on-axis thickness of the fifth lens L5 is defined as d9, an on-axis distance from an image-side surface of the fifth lens L5 to an object-side surface of the sixth lens L6 is defined as d10, and the camera optical lens 10 satisfies the condition: $1.50 \leq d10/d9 \leq 3.30$. The condition specifies a ratio between the on-axis thickness of the fifth lens L5 and on-axis distance from the image-side surface of the fifth lens L5 to the object-side surface of the sixth lens L6, within a range of which it contributes to lens processing and the assembly of the camera optical lens.

A total optical length from an object-side surface of the first lens L1 to an image surface Si of the camera optical lens 10 along an optical axis is defined as TTL, an on-axis thickness of the first lens L1 is defined as d1, and the camera optical lens 10 satisfies the condition: $-4.50 \leq (R1+R2)/(R1-R2) \leq -0.93$. Within a range specified by the condition, by controlling a shape of the first lens L1 reasonably, the first lens L1 can effectively correct the spherical aberration of the camera optical lens.

An on-axis thickness of the second lens L2 is defined as d3, the total optical length from the object-side surface of the first lens L1 to the image surface Si of the camera optical lens 10 along the optical axis is defined as TTL, and the camera optical lens 10 satisfies the condition: $0.01 \leq d3/TTL \leq 0.05$. The condition specifies a ratio between the on-axis thickness of the second lens L2 and the total optical length from the object-side surface of the first lens L1 to the image surface Si of the camera optical lens 10 along the optical axis, within a range of which it facilitates realizing ultra-thinness.

A focal length of the second lens L2 is defined as f2, the focal length of the camera optical lens is defined as f, and the camera optical lens 10 satisfies the condition: $-6.75 \leq f2/f \leq -0.93$. The condition specifies a ratio between the focal length of the second lens L2 and the focal length of the camera optical lens. By controlling the negative focal power of the second lens L2 in a reasonable range, it helps correct the aberration of the camera optical lens 10.

A curvature radius of an object-side surface of the second lens L2 is defined as R3, a curvature radius of an image-side surface of the second lens L2 is defined as R4, and the camera optical lens 10 satisfies the condition: $0.96 \leq (R3+R4)/(R3-R4) \leq 7.82$. The condition specifies a ratio range between a sum of the curvature radius of the object-side surface and the curvature radius of the image-side surface of the second lens L2 and a difference between the curvature radius of the object-side surface and the curvature radius of the image-side surface of the second lens L2, thereby specifying a shape of the second lens L2. Within a range specified by the condition, it helps correct the on-axis chromatic aberration with the development towards ultra-thin and wide-angle lens.

An on-axis thickness of the third lens L3 is defined as d5, the total optical length from the object-side surface of the first lens L1 to the image surface Si of the camera optical lens 10 along the optical axis is defined as TTL, and the camera optical lens 10 satisfies the condition: $0.02 \leq d5/TTL \leq 0.07$. The condition specifies a ratio between the on-axis thickness of the third lens L3 and the total optical length from the object-side surface of the first lens L1 to the image surface Si of the camera optical lens 10, within a range of which it facilitates realizing ultra-thinness.

A focal length of the third lens L3 is defined as f3, the focal length of the camera optical lens is defined as f, and the camera optical lens 10 satisfies the condition: $1.75 \leq f3/f \leq 60.76$. The condition specifies a ratio between the focal length of the third lens L3 and the focal length of the camera optical lens 10. Through a reasonable distribution in focal power, the camera optical lens 10 has better imaging quality and lower sensitivity.

A curvature radius of an object-side surface of the third lens L3 is defined as R5, a curvature radius of an image-side surface of the third lens L3 is defined as R6, and the camera optical lens 10 satisfies the condition: $-21.79 \leq (R5+R6)/(R5-R6) \leq 7.89$. The condition specifies a ratio between a sum of the curvature radius of the object-side surface and the curvature radius of the image-side surface of the third lens L3 and a difference between the curvature radius of the object-side surface and the curvature radius of the image-side surface of the third lens L3. Thereby, a shape of the lens L3 can be effectively controlled, which is conducive to the formation of the third lens L3 and avoiding the formation defects and stresses caused by excessive surface curvature of the third lens L3.

An on-axis thickness of the fourth lens L4 is defined as d7, the total optical length from the object-side surface of the first lens L1 to the image surface Si of the camera optical lens 10 along the optical axis is defined as TTL, and the camera optical lens 10 satisfies the condition: 0.01≤d7/TTL≤0.07. The condition specifies a ratio between the on-axis thickness of the fourth lens L4 and the total optical length from the object-side surface of the first lens L1 to the image surface Si of the camera optical lens 10 along the optical axis. Within a range specified by the condition, it facilitates realizing ultra-thinness.

A curvature radius of an object-side surface of the fourth lens L4 is defined as R7, a curvature radius of an image-side surface of the fifth lens L5 is defined as R8, and the camera optical lens 10 satisfies the condition: −2.17≤(R7+R8)/(R7−R8)≤16.70. The condition specifies a ratio between a sum of the curvature radius of the object-side surface and the curvature radius of the image-side surface of the fourth lens L4 and a difference between the curvature radius of the object-side surface and the curvature radius of the image-side surface of the fourth lens L4, thereby specifying a shape of the fourth lens L4. Within a range specified by the condition, it helps correct the off-axis aberration with the development towards ultra-thin and wide-angle lens.

An on-axis thickness of the fifth lens L5 is defined as d9, the total optical length from the object-side surface of the first lens L1 to the image surface Si of the camera optical lens 10 along the optical axis is defined as TTL, and the camera optical lens 10 satisfies the condition: 0.02≤d9/TTL≤0.07. The condition specifies a ratio between the on-axis thickness of the fifth lens L5 and the total optical length from the object-side surface of the first lens L1 to the image surface Si of the camera optical lens 10 along the optical axis. Within a range specified by the condition, it facilitates realizing ultra-thinness.

A curvature radius of an object-side surface of the fifth lens L5 is defined as R9, a curvature radius of an image-side surface of the fifth lens L5 is defined as R10, and the camera optical lens 10 satisfies the condition: −5.65≤(R9+R10)/(R9−R10)≤0.93. The condition specifies a ratio between a sum of the curvature radius of the object-side surface and the curvature radius of the image-side surface of the fifth lens L5 and a difference between the curvature radius of the object-side surface and the curvature radius of the image-side surface of the fifth lens L5, thereby specifying a shape of the fifth lens L5. Within a range specified by the condition, it helps correct the off-axis aberration with the development towards ultra-thin and wide-angle lens.

The total optical length from the object-side surface of the first lens L1 to the image surface Si of the camera optical lens 10 along the optical axis is defined as TTL, an on-axis thickness of the sixth lens L6 is defined as d11, and the camera optical lens 10 satisfies the condition: 0.02≤d11/TTL≤0.08. The condition specifies a ratio between the on-axis thickness of the sixth lens L6 and the total optical length from the object-side surface of the first lens L1 to the image surface Si of the camera optical lens 10 along the optical axis. Within a range specified by the condition, it facilitates realizing ultra-thinness.

A focal length of the sixth lens L6 is defined as f6, the focal length of the camera optical lens is defined as f, and the camera optical lens 10 satisfies the condition: −824.15≤f6/f≤−1.62. The condition specifies a ratio between the focal length of the sixth lens L6 and the focal length of the camera optical lens 10. Within a range specified by the condition and through a reasonable distribution in focal power, the camera optical lens 10 has better imaging quality and lower sensitivity.

An on-axis thickness of the seventh lens L7 is defined as d13, the total optical length from the object-side surface of the first lens L1 to the image surface Si of the camera optical lens 10 along the optical axis is defined as TTL, and the camera optical lens 10 satisfies the condition: 0.03≤d13/TTL≤0.11. The condition specifies a ratio between the on-axis thickness of the seventh lens L7 and the total optical length from the object-side surface of the first lens L1 to the image surface Si of the camera optical lens 10 along the optical axis. Within a range specified by the condition, it facilitates realizing ultra-thinness.

A focal length of the seventh lens L7 is defined as f7, the focal length of the camera optical lens is defined as f, and the camera optical lens 10 satisfies the condition: 0.66≤f7/f≤4.79. The condition specifies a ratio between the focal length of the seventh lens L7 and the focal length of the camera optical lens 10. Within a range specified by the condition and through a reasonable distribution in focal power, the camera optical lens 10 has better imaging quality and lower sensitivity.

A curvature radius of an object-side surface of the seventh lens L7 is defined as R13, a curvature radius of an image-side surface of the seventh lens L7 is defined as R14, and the camera optical lens 10 satisfies the condition: −20.65≤(R13+R14)/(R13−R14)≤−2.69. The condition specifies a ratio between a sum of the curvature radius of the object-side surface and the curvature radius of the image-side surface of the seventh lens L7 and a difference between the curvature radius of the object-side surface and the curvature radius of the image-side surface of the seventh lens L7, thereby specifying a shape of the seventh lens L7. Within a range specified by the condition, it facilitates realizing ultra-thinness.

An on-axis thickness of the eighth lens L8 is defined as d15, the total optical length from the object-side surface of the first lens L1 to the image surface Si of the camera optical lens 10 along the optical axis is defined as TTL, and the camera optical lens 10 satisfies the condition: −1.69≤f8/f≤−0.52. The condition specifies a ratio between the on-axis thickness of the eighth lens L8 and the total optical length from the object-side surface of the first lens L1 to the image surface Si of the camera optical lens 10 along the optical axis. Within a range specified by the condition, it facilitates realizing ultra-thinness.

A focal length of the eighth lens L8 is defined as f8, the focal length of the camera optical lens 10 is defined as f, and the camera optical lens 10 satisfies the condition: −1.69≤f8/f≤−0.52. The condition specifies a ratio between the focal length of the eighth lens L8 and the focal length of the camera optical lens 10. Within a range specified by the condition and through a reasonable distribution in focal power, the camera optical lens 10 has better imaging quality and lower sensitivity.

A curvature radius of an object-side surface of the eighth lens L8 is defined as R15, a curvature radius of an image-side surface of the eighth lens L8 is defined as R16, and the camera optical lens 10 satisfies the condition: −0.97≤(R15+R16)/(R15−R16)≤−0.21. The condition specifies a ratio between a sum of the curvature radius of the object-side surface and the curvature radius of the image-side surface of the eighth lens L8 and a difference between the curvature radius of the object-side surface and the curvature radius of the image-side surface of the eighth lens L8, thereby specifying a shape of the eighth lens L8. Within a range specified by the condition, it helps correct the off-axis aberration with the development towards ultra-thin and wide-angle lens.

When satisfying the above conditions, the camera optical lens 10 may have good optical functions and may satisfy the design requirement of large aperture, wide angle and ultra-thinness. According to the characteristics of the camera optical lens 10, the camera optical lens 10 is especially fit for WEB camera lenses and mobile phone camera lens assemblies composed by such camera elements as CCD and CMOS for high pixels.

In addition, in the camera optical lens provided by the present disclosure, the surface of each lens may be set as an aspheric surface, which may be easily made into a shape beyond the sphere to obtain more control variables to reduce aberration and thus reduce the number of lenses used. Therefore, the total optical length from the object-side surface of the first lens L1 to the image surface Si of the camera optical lens 10 along the optical axis of the present disclosure may be effectively reduced. In the embodiment of the present disclosure, the object-side surface and image-side surface of each lens are aspheric surfaces.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (from the object-side surface of the first lens L1 to the image surface Si of the camera optical lens 10 along the optical axis) in mm.

Preferably, inflexion points and/or arrest points can be arranged on the object-side surface and/or the image-side surface of the lens, so as to satisfy the demand for high quality imaging. The description below can be referred for specific implementations.

FIG. 1 is a schematic diagram of a structure of the camera optical lens 10 according to Embodiment 1 of the present disclosure. The design data of the camera optical lens 10 in Embodiment 1 of the present disclosure are shown in the following.

Table 1 and Table 2 list the design data of the camera optical lens 10 in Embodiment 1 of the present disclosure. It shall be noted that in this embodiment, units of distance, radius and center thickness are millimeter (mm).

TABLE 1

| | R | d | nd | vd |
|---|---|---|---|---|
| S1 | ∞ | d0 = −1.052 | | |
| R1 | 3.021 | d1 = 1.257 | nd1 1.5444 | v1 55.82 |
| R2 | 18.395 | d2 = 0.147 | | |
| R3 | 18.498 | d3 = 0.322 | nd2 1.6700 | v2 19.39 |
| R4 | 5.804 | d4 = 0.382 | | |
| R5 | 9.091 | d5 = 0.340 | nd3 1.5661 | v3 37.71 |
| R6 | 11.639 | d6 = 0.383 | | |
| R7 | −165.006 | d7 = 0.459 | nd4 1.6153 | v4 25.94 |
| R8 | 311.411 | d8 = 0.252 | | |
| R9 | 17.098 | d9 = 0.380 | nd5 1.6153 | v5 25.94 |
| R10 | 54.020 | d10 = 1.088 | | |
| R11 | −9.399 | d11 = 0.500 | nd6 1.5661 | v6 37.71 |
| R12 | −12.098 | d12 = 0.166 | | |
| R13 | 3.322 | d13 = 0.528 | nd7 1.5444 | v7 55.82 |
| R14 | 4.162 | d14 = 1.535 | | |
| R15 | −5.318 | d15 = 0.842 | nd8 1.5346 | v8 55.69 |
| R16 | 13.717 | d16 = 0.400 | | |
| R17 | ∞ | d17 = 0.210 | ndg 1.5168 | vg 64.17 |
| R18 | ∞ | d18 = 0.379 | | |

In the table, meanings of various symbols will be described as follows.
R: curvature radius of an optical surface;
S1: aperture;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of the object-side surface of the sixth lens L6;
R12: curvature radius of the image-side surface of the sixth lens L6;
R13: curvature radius of the object-side surface of the seventh lens L7;
R14: curvature radius of the image-side surface of the seventh lens L7;
R15: curvature radius of the object-side surface of the eighth lens L8;
R16: curvature radius of the image-side surface of the eighth lens L8;
R17: curvature radius of an object-side surface of the optical filter GF;
R18: curvature radius of an image-side surface of the optical filter GF;
d: on-axis thickness of a lens or on-axis distance between neighboring lens;
d0: on-axis distance from the aperture S1 to the object-side surface of the first lens L1;
d1: on-axis thickness of the first lens L1;
d2: on-axis distance from the image-side surface of the first lens L1 to the side surface of the second lens L2;
d3: on-axis thickness of the second lens L2;
d4: on-axis distance from the image-side surface of the second lens L2 to the side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the eighth lens L8;
d15: on-axis thickness of the eighth lens L8;
d16: on-axis distance from the image-side surface of the eighth lens L8 to the object-side surface of the optical filter GF;
d17: on-axis thickness of the optical filter GF;
d18: on-axis distance from the image-side surface to the image surface Si of the optical filter GF;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
nd7: refractive index of the d line of the seventh lens L7;
nd8: refractive index of the d line of the eighth lens L8;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the sixth lens L7;
v8: abbe number of the sixth lens L8;
vg: abbe number of the optical filter GF.

TABLE 2

| | Conic coefficient | Aspheric surface coefficients | | | |
|---|---|---|---|---|---|
| | k | A4 | A6 | A8 | A10 |
| R1 | −1.1012E−01 | 2.5059E−04 | 3.4941E−05 | 4.3524E−06 | −3.7584E−06 |
| R2 | 1.0000E+01 | −1.5678E−04 | 4.7159E−04 | −2.4778E−04 | 9.2908E−05 |
| R3 | 9.9824E+00 | 4.5433E−03 | 3.9915E−04 | 3.4429E−04 | −3.6803E−04 |
| R4 | −4.5412E+00 | 9.1409E−03 | 5.3130E−04 | 2.4397E−03 | −4.4487E−03 |
| R5 | 8.3923E+00 | −8.8602E−03 | −1.4462E−03 | 3.7533E−03 | −4.7490E−03 |
| R6 | 1.0000E+01 | −9.9314E−03 | 4.2144E−03 | −8.8574E−03 | 1.0261E−02 |
| R7 | −9.0000E+01 | −9.8704E−03 | 8.8226E−04 | −8.5039E−04 | 1.8396E−04 |
| R8 | −6.5000E+01 | −1.3928E−02 | −2.4017E−03 | 2.8015E−03 | −1.7320E−03 |
| R9 | −9.9663E+00 | −8.3112E−03 | −1.5139E−02 | 1.4075E−02 | −8.9184E−03 |
| R10 | −9.0000E+01 | −1.2815E−03 | −1.1126E−02 | 7.0569E−03 | −3.0104E−03 |
| R11 | 7.3409E+00 | 2.8344E−02 | −1.5462E−02 | 2.5045E−03 | 6.3002E−04 |
| R12 | 5.2974E+00 | 1.7425E−02 | −1.3462E−02 | 3.9718E−03 | −7.3668E−04 |
| R13 | −5.0048E+00 | −1.2146E−02 | 1.2160E−04 | −2.0333E−04 | 4.4927E−05 |
| R14 | −1.1791E+01 | 1.4473E−03 | −2.0047E−03 | 1.8608E−04 | 7.3751E−06 |
| R15 | −2.1200E+01 | −2.9060E−02 | 6.5044E−03 | −7.6923E−04 | 5.5611E−05 |
| R16 | −2.5819E+01 | −1.7558E−02 | 2.6344E−03 | −2.4919E−04 | 1.4755E−05 |

| | Aspheric surface coefficients | | | | |
|---|---|---|---|---|---|
| | A12 | A14 | A16 | A18 | A20 |
| R1 | −1.5835E−07 | 0.0000E+00 | 0.0000E+00 | 0.0000E+00 | 0.0000E+00 |
| R2 | −2.6074E−05 | 4.9733E−06 | −5.2982E−07 | 2.2447E−08 | 0.0000E+00 |
| R3 | 1.5063E−04 | −2.7225E−05 | 1.8020E−06 | 0.0000E+00 | 0.0000E+00 |
| R4 | 4.0719E−03 | −2.1034E−03 | 6.2762E−04 | −1.0006E−04 | 6.5908E−06 |
| R5 | 3.4370E−03 | −1.4607E−03 | 3.7435E−04 | −5.2243E−05 | 3.0078E−06 |
| R6 | −7.3709E−03 | 3.3473E−03 | −9.1982E−04 | 1.4125E−04 | −9.3094E−06 |
| R7 | −1.1255E−04 | 7.6356E−05 | −2.4129E−05 | 4.0251E−06 | −2.7519E−07 |
| R8 | 4.8667E−04 | −6.7647E−05 | 3.7936E−06 | 0.0000E+00 | 0.0000E+00 |
| R9 | 3.8212E−03 | −1.1065E−03 | 2.0285E−04 | −2.0951E−05 | 9.2295E−07 |
| R10 | 8.8669E−04 | −1.7926E−04 | 2.3578E−05 | −1.7774E−06 | 5.7348E−08 |
| R11 | −5.1114E−04 | 1.3605E−04 | −1.8675E−05 | 1.3118E−06 | −3.6921E−08 |
| R12 | 6.7807E−05 | −2.3429E−07 | −4.7139E−07 | 3.4612E−08 | −7.9290E−10 |
| R13 | −3.5796E−06 | 1.3105E−07 | −1.8802E−09 | −6.4774E−12 | 3.0849E−13 |
| R14 | −3.0154E−06 | 2.7561E−07 | −1.2335E−08 | 2.7748E−10 | −2.5034E−12 |
| R15 | −2.5603E−06 | 7.5429E−08 | −1.3784E−09 | 1.4252E−11 | −6.3849E−14 |
| R16 | −5.5275E−07 | 1.3013E−08 | −1.8637E−10 | 1.5023E−12 | −5.4028E−15 |

In Table 2, k is a conic coefficient, and A4, A6, A8, A10, A12, A14, A16, A18 and A20 are aspheric surface coefficients.

It shall be noted that the non-spheres in each lens in this embodiment are ones represented by the following formula, but a specific form of the following formula is only one example. Practically, the present disclosure is not limited to this formula.

$$Y=(x^2/R)/\{1+[1-(1+k)((x^2/R^2)]^{1/2})\}+A4x^4+A6x^6+A8x^8+A10x^{10}+A12x^{12}+A14x^{14}+A16x^{16}+A18x^{18}+A20x^{20}$$

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, P7R1 and P7R2 represent the object-side surface and the image-side surface of the seventh lens L7, and P8R1 and P8R2 represent the object-side surface and the image-side surface of the eighth lens L8. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 0 | | | |
| P1R2 | 0 | | | |
| P2R1 | 0 | | | |
| P2R2 | 0 | | | |
| P3R1 | 0 | | | |
| P3R2 | 2 | 0.935 | 1.365 | |
| P4R1 | 1 | 1.805 | | |
| P4R2 | 1 | 0.145 | | |
| P5R1 | 1 | 0.565 | | |
| P5R2 | 2 | 0.495 | 2.315 | |
| P6R1 | 1 | 2.675 | | |
| P6R2 | 2 | 2.765 | 3.065 | |
| P7R1 | 2 | 1.085 | 3.175 | |
| P7R2 | 2 | 1.275 | 4.675 | |
| P8R1 | 2 | 2.275 | 6.105 | |
| P8R2 | 3 | 0.615 | 5.345 | 6.305 |

TABLE 4

| | Number(s) of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 0 | | |
| P3R2 | 0 | | |
| P4R1 | 0 | | |
| P4R2 | 1 | 0.235 | |
| P5R1 | 1 | 0.935 | |
| P5R2 | 1 | 0.775 | |
| P6R1 | 0 | | |
| P6R2 | 0 | | |
| P7R1 | 1 | 1.935 | |
| P7R2 | 1 | 2.315 | |
| P8R1 | 1 | 5.605 | |
| P8R2 | 1 | 1.125 | |

Figure 2:
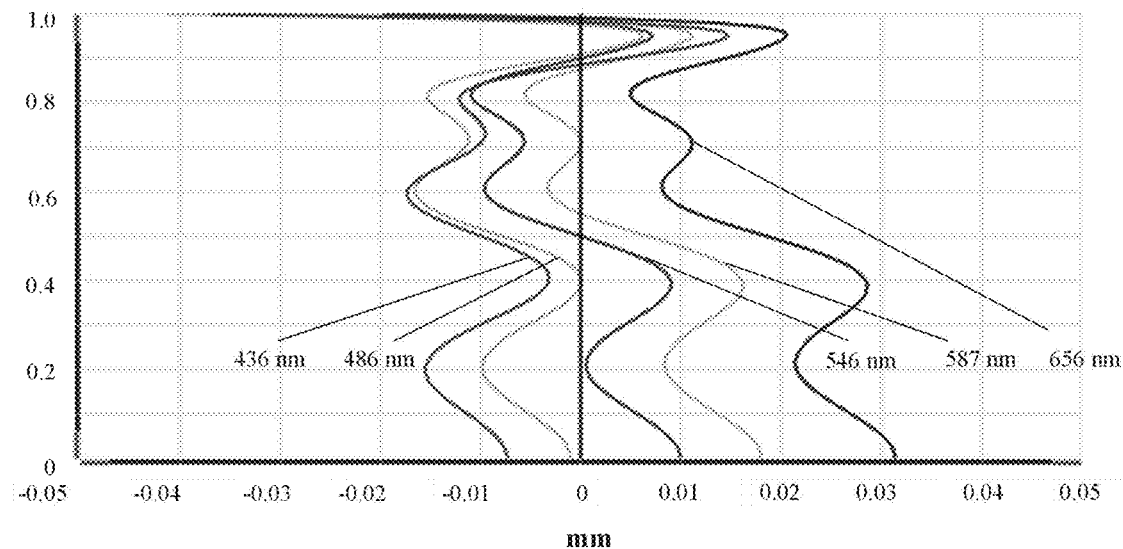
FIG. 2 is a schematic diagram of a longitudinal aberration of the camera optical lens shown in FIG. 1.
Figure 3:
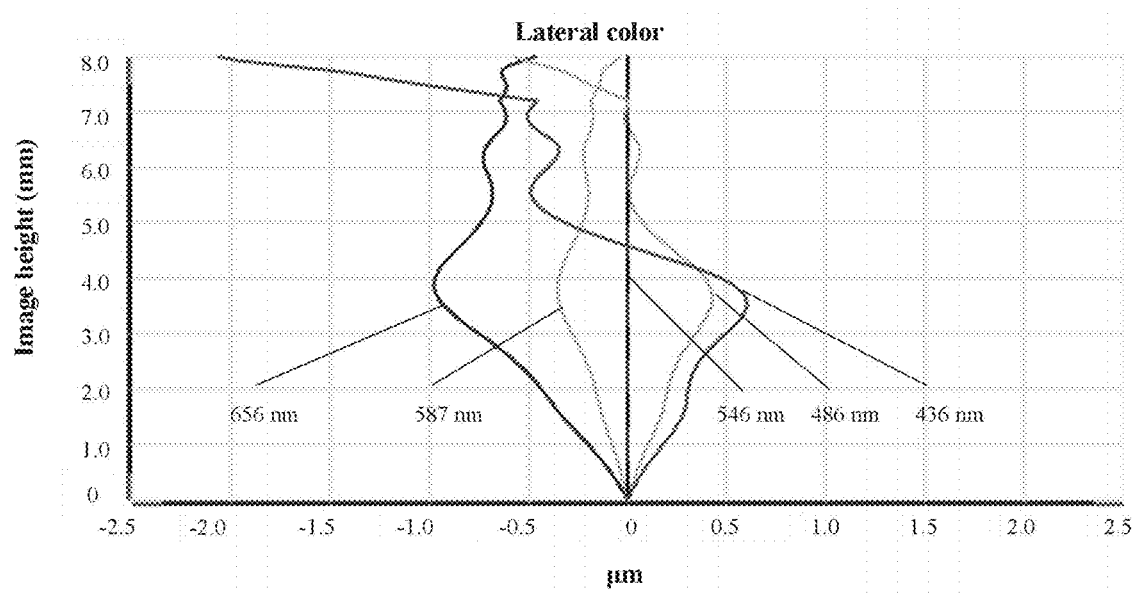
FIG. 3 is a schematic diagram of a lateral color of the camera optical lens shown in FIG. 1.
Figure 4:
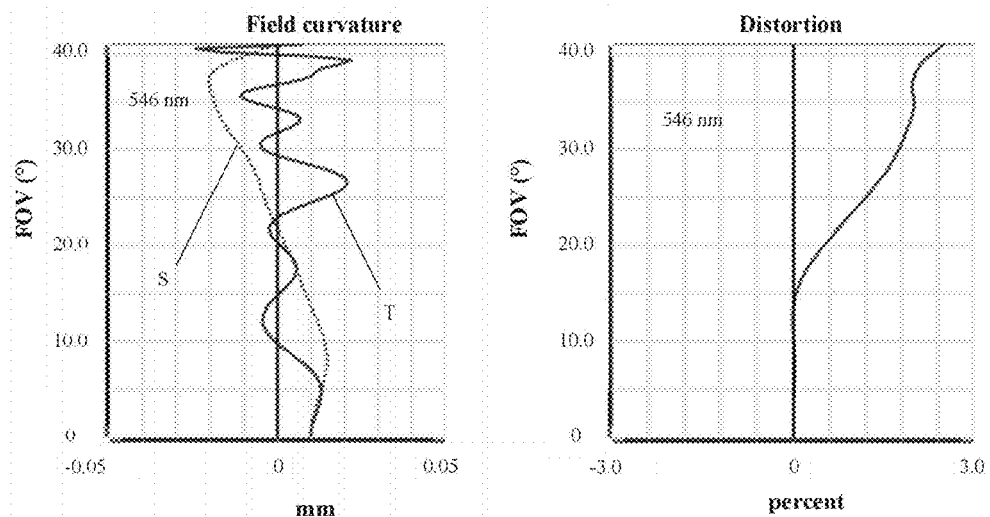
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 436 nm, 486 nm, 546 nm, 587 nm and 656 nm after passing the camera optical lens 10 according to Embodiment 1, respectively. FIG. 4 illustrates a field curvature and a distortion of light with a wavelength of 546 nm after passing the camera optical lens 10 according to Embodiment 1. A field curvature S in FIG. 4 is a field curvature in a sagittal direction, and T is a field curvature in a tangential direction.

Table 17 in the following shows various values of Embodiments 1, 2, 3, 4 and values corresponding to parameters which are specified in the above conditions.

As shown in Table 13, Embodiment 1 satisfies the above conditions.

In this embodiment, an entrance pupil diameter of the camera optical lens 10 is 4.662 mm, an image height of 1.0H is 8.000 mm, a FOV (field of view) in a diagonal direction is 80.00°. Thus, the camera optical lens has a wide-angle and is ultra-thin. Its on-axis and off-axis aberrations are fully corrected, thereby achieving excellent optical characteristics.

Embodiment 2

Figure 5:
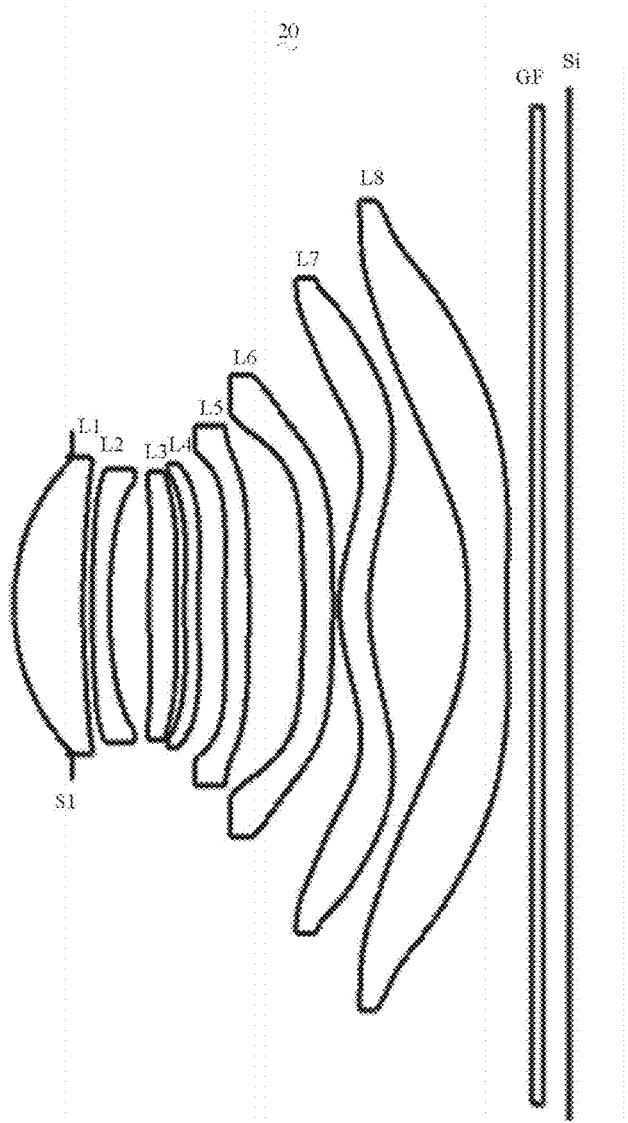
FIG. 5 is a schematic diagram of a structure of a camera optical lens according to Embodiment 2 of the present disclosure.

FIG. 5 is a schematic diagram of a structure of a camera optical lens 20 according to Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | nd | v d |
|---|---|---|---|---|
| S1 | ∞ | d0 = −1.011 | | |
| R1 | 3.070 | d1 = 1.192 | nd1 1.5450 | v1 55.81 |
| R2 | 12.556 | d2 = 0.154 | | |
| R3 | 10.683 | d3 = 0.300 | nd2 1.6700 | v2 19.39 |
| R4 | 5.742 | d4 = 0.688 | | |
| R5 | 23.288 | d5 = 0.456 | nd3 1.5778 | v3 35.41 |
| R6 | 27.995 | d6 = 0.155 | | |
| R7 | 14.504 | d7 = 0.238 | nd4 1.5969 | v4 29.66 |
| R8 | 12.113 | d8 = 0.456 | | |
| R9 | 99.345 | d9 = 0.412 | nd5 1.5824 | v5 33.90 |
| R10 | −23.454 | d10 = 0.943 | | |
| R11 | −6.424 | d11 = 0.500 | nd6 1.5750 | v6 36.49 |
| R12 | −13.164 | d12 = 0.109 | | |
| R13 | 2.46 | d13 = 0.512 | nd7 1.5459 | v7 54.91 |
| R14 | 3.428 | d14 = 1.708 | | |
| R15 | −6.041 | d15 = 0.664 | nd8 1.5352 | v8 56.12 |
| R16 | 11.748 | d16 = 0.424 | | |
| R17 | ∞ | d17 = 0.210 | ndg 1.5168 | vg 64.17 |
| R18 | ∞ | d18 = 0.448 | | |

TABLE 6

| | Conic coefficient | Aspheric surface coefficients | | | |
|---|---|---|---|---|---|
| | k | A4 | A6 | A8 | A10 |
| R1 | −5.9161E−02 | −1.1371E−02 | 1.9168E−02 | −1.7711E−02 | 1.0101E−02 |
| R2 | −4.8883E+00 | 3.7134E−03 | −2.4481E−02 | 2.9498E−02 | −1.9481E−02 |
| R3 | −1.5278E+01 | −2.9267E−02 | 2.9489E−02 | −2.2887E−02 | 1.3954E−02 |
| R4 | −1.4841E+01 | −2.5267E−02 | 6.1137E−02 | −7.2051E−02 | 5.6694E−02 |
| R5 | 0.0000E+00 | 1.2442E−02 | −5.2018E−02 | 7.0065E−02 | −5.7391E−02 |
| R6 | −2.3770E+02 | −2.5213E−03 | −3.6488E−02 | 5.2945E−02 | −4.3153E−02 |
| R7 | −3.3082E+02 | 1.8461E−02 | −1.1655E−01 | 1.5865E−01 | −1.2320E−01 |
| R8 | −1.0000E+03 | 3.9421E−02 | −1.2222E−01 | 1.4168E−01 | −9.8986E−02 |
| R9 | 0.0000E+00 | 1.7823E−02 | −3.1815E−02 | 2.0019E−02 | −7.7181E−03 |
| R10 | −3.0000E+02 | 2.3104E−02 | −3.0444E−02 | 1.7849E−02 | −6.9122E−03 |
| R11 | 2.8100E+00 | 6.7623E−02 | −4.1891E−02 | 1.5012E−02 | −3.4776E−03 |
| R12 | 1.1318E+01 | 2.7002E−02 | −2.0070E−02 | 6.3437E−03 | −1.2315E−03 |
| R13 | −6.8799E+00 | −2.6459E−03 | −1.8806E−03 | 1.2543E−04 | −6.7514E−06 |
| R14 | −1.1046E+01 | 5.8864E−03 | −2.0478E−03 | −1.9107E−05 | 5.1210E−05 |
| R15 | −3.6840E+01 | −3.5259E−02 | 7.9379E−03 | −9.7163E−04 | 7.3034E−05 |
| R16 | −5.2564E+01 | −1.6624E−02 | 2.5017E−03 | −2.1647E−04 | 7.9591E−06 |

| | Aspheric surface coefficients | | | | |
|---|---|---|---|---|---|
| | A12 | A14 | A16 | A18 | A20 |
| R1 | −3.6956E−03 | 8.7129E−04 | −1.2826E−04 | 1.0725E−05 | −3.8853E−07 |
| R2 | 7.9776E−03 | −2.0671E−03 | 3.2984E−04 | −2.9548E−05 | 1.1352E−06 |
| R3 | −5.8153E−03 | 1.5801E−03 | −2.6619E−04 | 2.5247E−05 | −1.0359E−06 |
| R4 | −2.8987E−02 | 9.5723E−03 | −1.9705E−03 | 2.3052E−04 | −1.1728E−05 |
| R5 | 2.9425E−02 | −9.5129E−03 | 1.8835E−03 | −2.0797E−04 | 9.7914E−06 |
| R6 | 2.1089E−02 | −6.3811E−03 | 1.1771E−03 | −1.2131E−04 | 5.3549E−06 |
| R7 | 5.9454E−02 | −1.8232E−02 | 3.4679E−03 | −3.7378E−04 | 1.7449E−05 |

TABLE 6-continued

| | | | | | |
|---|---|---|---|---|---|
| R8  | 4.4055E−02  | −1.2594E−02 | 2.2386E−03  | −2.2521E−04 | 9.7902E−06  |
| R9  | 1.8828E−03  | −3.0535E−04 | 3.3219E−05  | −2.3561E−06 | 8.7573E−08  |
| R10 | 1.8190E−03  | −3.2455E−04 | 3.7084E−05  | −2.3970E−06 | 6.5699E−08  |
| R11 | 4.4551E−05  | −1.5624E−05 | −3.4640E−06 | 4.5924E−07  | −1.6975E−08 |
| R12 | 1.3902E−04  | −7.8628E−06 | 9.8120E−08  | 9.5941E−09  | −3.2267E−10 |
| R13 | 2.1265E−06  | −2.5071E−07 | 1.2897E−08  | −3.1217E−10 | 2.9301E−12  |
| R14 | −7.6302E−06 | 5.5759E−07  | −2.2402E−08 | 4.7128E−10  | −4.0521E−12 |
| R15 | −3.4715E−06 | 1.0403E−07  | −1.8944E−09 | 1.9034E−11  | −8.0412E−14 |
| R16 | 1.1769E−07  | −2.1347E−08 | 7.6899E−10  | −1.2206E−11 | 7.4228E−14  |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 | Inflexion point position 4 |
|---|---|---|---|---|---|
| P1R1 | 0 | | | | |
| P1R2 | 0 | | | | |
| P2R1 | 1 | 2.125 | | | |
| P2R2 | 0 | | | | |
| P3R1 | 2 | 0.665 | 1.725 | | |
| P3R2 | 2 | 0.455 | 1.845 | | |
| P4R1 | 2 | 0.465 | 2.055 | | |
| P4R2 | 2 | 0.515 | 2.165 | | |
| P5R1 | 2 | 0.635 | 2.385 | | |
| P5R2 | 1 | 2.325 | | | |
| P6R1 | 4 | 0.605 | 0.855 | 2.695 | 2.985 |
| P6R2 | 2 | 2.785 | 3.175 | | |
| P7R1 | 4 | 1.135 | 3.205 | 3.945 | 4.225 |
| P7R2 | 2 | 1.415 | 4.775 | | |
| P8R1 | 3 | 2.565 | 5.775 | 6.045 | |
| P8R2 | 3 | 0.635 | 5.285 | 5.985 | |

TABLE 8

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 2 | 1.155 | 1.935 |
| P3R2 | 1 | 0.775 | |
| P4R1 | 1 | 0.785 | |
| P4R2 | 1 | 0.885 | |
| P5R1 | 1 | 0.915 | |
| P5R2 | 0 | | |
| P6R1 | 0 | | |
| P6R2 | 0 | | |
| P7R1 | 1 | 2.075 | |
| P7R2 | 1 | 2.525 | |
| P8R1 | 1 | 6.175 | |
| P8R2 | 1 | 1.195 | |

Figure 6:
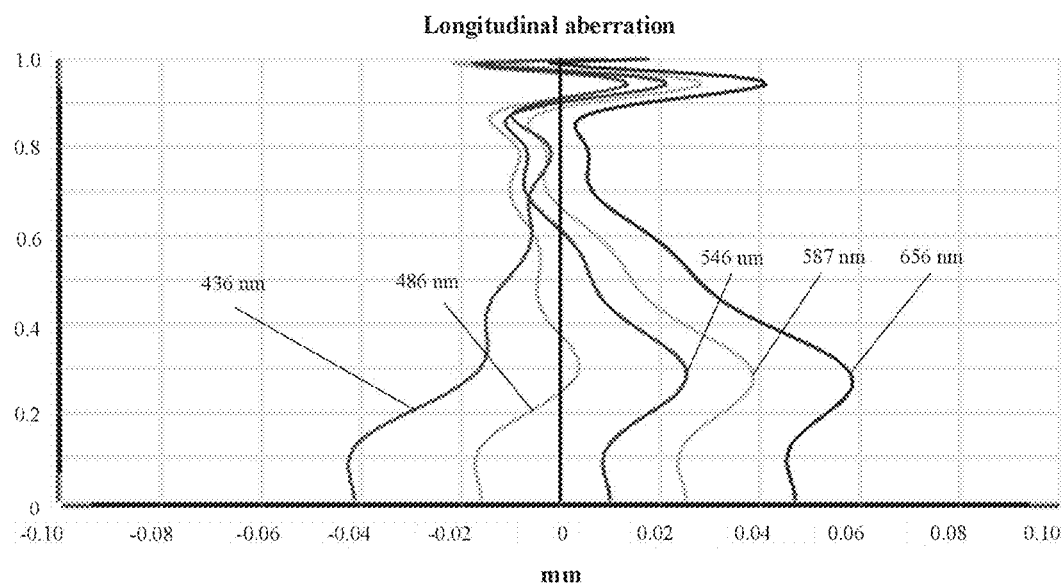
FIG. 6 is a schematic diagram of a longitudinal aberration of the camera optical lens shown in FIG. 5.
Figure 7:
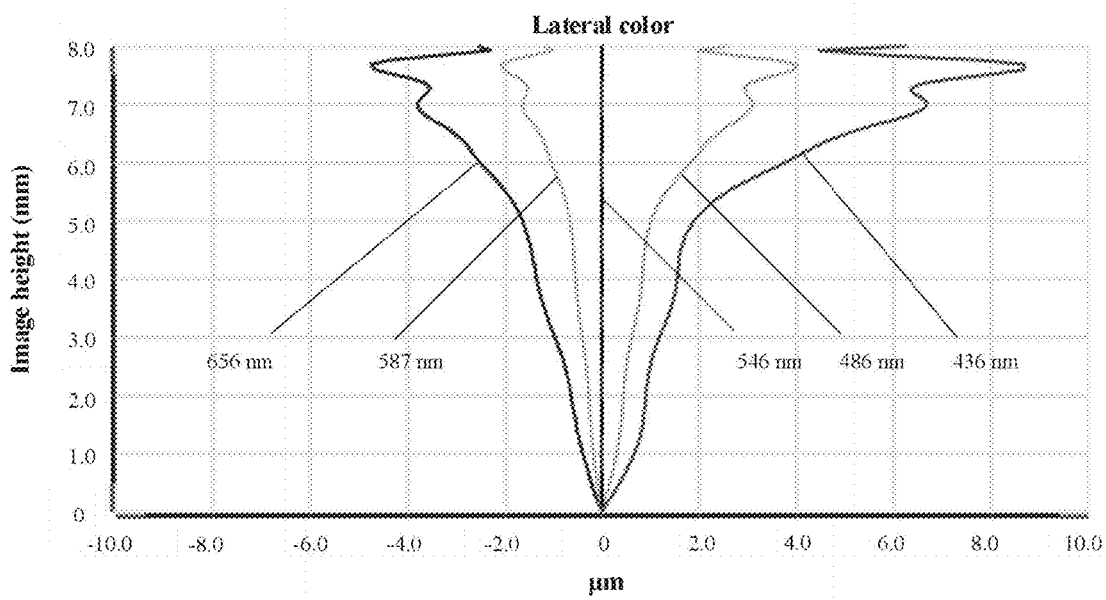
FIG. 7 is a schematic diagram of a lateral color of the camera optical lens shown in FIG. 5.
Figure 8:
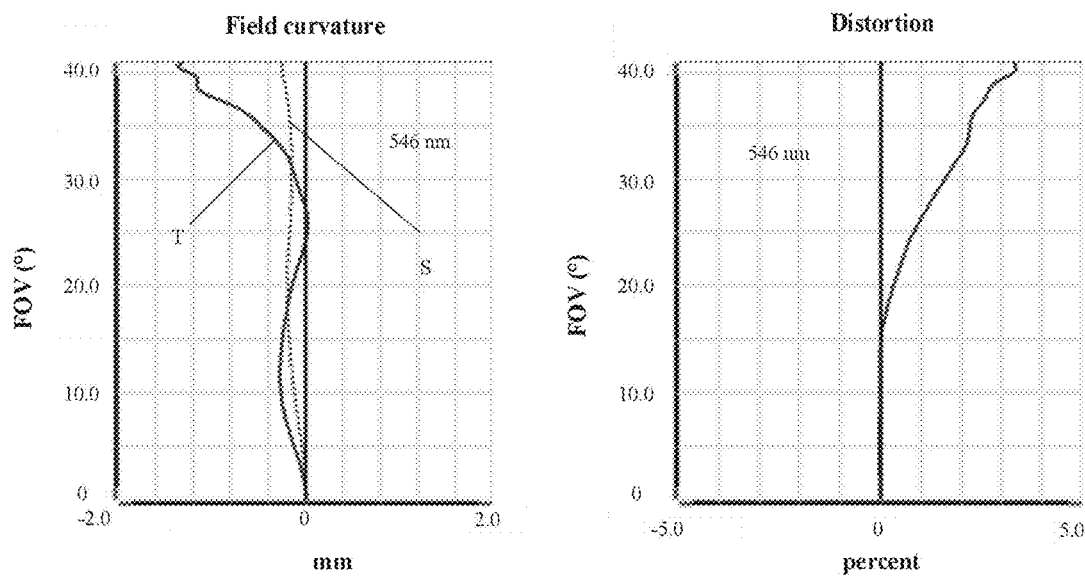
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 436 nm, 486 nm, 546 nm, 587 nm and 656 nm after passing the camera optical lens 20 according to Embodiment 2. FIG. 8 illustrates a field curvature and a distortion of light with a wavelength of 546 nm after passing the camera optical lens 20 according to Embodiment 2. A field curvature S in FIG. 8 is a field curvature in a sagittal direction, and T is a field curvature in a tangential direction.

As shown in Table 17, Embodiment 2 satisfies the above conditions.

In this embodiment, an entrance pupil diameter of the camera optical lens 20 is 4.622 mm, an image height of 1.0H is 8.000 mm, a FOV (field of view) in the diagonal direction is 80.00°. Thus, the camera optical lens 20 has a wide-angle and is ultra-thin. Its on-axis and off-axis aberrations are fully corrected, thereby achieving excellent optical characteristics.

Embodiment 3

Figure 9:
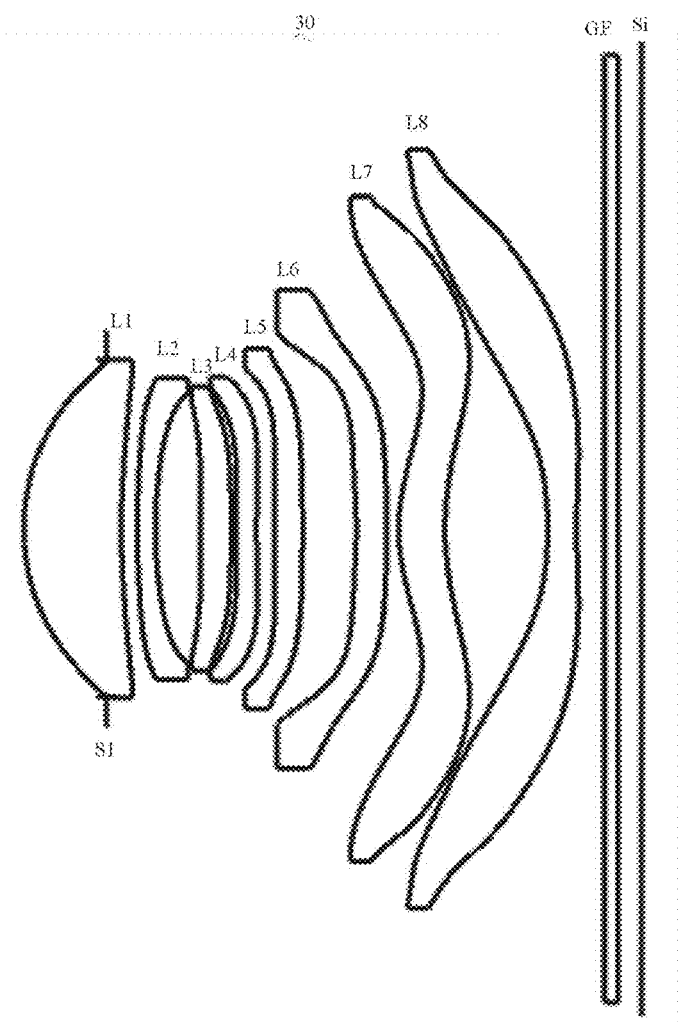
FIG. 9 is a schematic diagram of a structure of a camera optical lens according to Embodiment 3 of the present disclosure.

FIG. 9 is a schematic diagram of a structure of a camera optical lens 30 according to Embodiment 3 of the present disclosure. Embodiment 3 is basically the same as Embodiment 1 and involves symbols in the following tables having the same meanings as Embodiment 1, so the same parts are not repeated here, and only differences therebetween will be described in the following.

Table 9 and Table 10 show design data of the camera optical lens 30 in Embodiment 3 of the present disclosure.

TABLE 9

| | R | d | nd | ν d |
|---|---|---|---|---|
| S1  | ∞       | d0 = −1.354 |            |            |
| R1  | 3.417   | d1 = 1.591  | nd1 1.5356 | ν1 74.64   |
| R2  | 12.743  | d2 = 0.256  |            |            |
| R3  | 10.464  | d3 = 0.300  | nd2 1.6446 | ν2 21.82   |
| R4  | 6.747   | d4 = 0.749  |            |            |
| R5  | −95.769 | d5 = 0.491  | nd3 1.5587 | ν3 44.67   |
| R6  | −65.188 | d6 = 0.084  |            |            |
| R7  | 22.249  | d7 = 0.337  | nd4 1.5740 | ν4 37.01   |
| R8  | 13.087  | d8 = 0.289  |            |            |
| R9  | 53.131  | d9 = 0.465  | nd5 1.5450 | ν5 55.81   |
| R10 | −19.773 | d10 = 0.872 |            |            |
| R11 | −6.827  | d11 = 0.500 | nd6 1.5838 | ν6 33.45   |
| R12 | −15.135 | d12 = 0.192 |            |            |
| R13 | 2.912   | d13 = 0.761 | nd7 1.5450 | ν7 55.81   |
| R14 | 4.834   | d14 = 1.696 |            |            |
| R15 | −6.037  | d15 = 0.473 | nd8 1.5352 | ν8 56.12   |
| R16 | 12.627  | d16 = 0.448 |            |            |
| R15 | ∞       | d17 = 0.210 | ndg 1.5168 | νg 64.17   |
| R16 | ∞       | d18 = 0.389 |            |            |

TABLE 10

| | Conic coefficient | Aspherical surface coefficients | | | |
|---|---|---|---|---|---|
| | k | A4 | A6 | A8 | A10 |
| R1 | −5.4938E−02 | −7.7590E−03 | 9.3176E−03  | −6.3028E−03 | 2.6245E−03  |
| R2 | −8.0481E+00 | −1.5962E−03 | −3.2641E−03 | 2.9007E−03  | −1.2830E−03 |

TABLE 10-continued

| | | | | | |
|---|---|---|---|---|---|
| R3 | −2.1673E+01 | −1.3576E−02 | 6.5062E−03 | −2.8375E−03 | 1.5170E−03 |
| R4 | −2.2147E+01 | −4.5186E−03 | 1.0279E−02 | −9.9563E−03 | 7.4467E−03 |
| R5 | 0.0000E+00 | 5.4548E−03 | −2.1933E−02 | 2.1976E−02 | −1.3974E−02 |
| R6 | 6.6562E+02 | 8.7626E−03 | −5.3725E−02 | 6.2937E−02 | −4.1142E−02 |
| R7 | −3.8163E+02 | 1.6554E−02 | −9.5220E−02 | 1.1328E−01 | −7.3020E−02 |
| R8 | −1.0000E+03 | 3.2146E−02 | −8.2036E−02 | 7.6909E−02 | −4.1522E−02 |
| R9 | 0.0000E+00 | 2.6282E−02 | −4.3974E−02 | 2.8860E−02 | −1.1297E−02 |
| R10 | −2.9976E+02 | 1.9994E−02 | −2.0411E−02 | 7.8419E−03 | −1.5378E−03 |
| R11 | 2.5270E+00 | 5.0575E−02 | −2.3608E−02 | 6.3901E−03 | −1.1009E−03 |
| R12 | 1.0947E+01 | 1.2612E−02 | −7.1996E−03 | 1.4247E−03 | −1.6003E−04 |
| R13 | −7.2741E+00 | −3.2692E−03 | −1.4404E−04 | −2.4870E−04 | 4.5865E−05 |
| R14 | −1.1287E+01 | 3.6400E−03 | −1.0087E−03 | −4.5999E−05 | 2.5635E−05 |
| R15 | −2.9118E+01 | −3.0491E−02 | 5.7910E−03 | −6.0579E−04 | 3.8780E−05 |
| R16 | −4.1297E+01 | −1.4655E−02 | 1.7711E−03 | −8.8955E−05 | −4.3882E−06 |

| Aspherical surface coefficients | | | | | |
|---|---|---|---|---|---|
| | A12 | A14 | A16 | A18 | A20 |
| R1 | −6.9712E−04 | 1.1858E−04 | −1.2518E−05 | 7.4719E−07 | −1.9309E−08 |
| R2 | 3.5087E−04 | −6.1311E−05 | 6.6679E−06 | −4.1116E−07 | 1.0931E−08 |
| R3 | −5.7887E−04 | 1.3844E−04 | −1.9835E−05 | 1.5665E−06 | −5.2897E−08 |
| R4 | −3.5071E−03 | 1.0347E−03 | −1.8553E−04 | 1.8509E−05 | −7.8535E−07 |
| R5 | 5.6755E−03 | −1.4677E−03 | 2.3403E−04 | −2.0939E−05 | 8.0579E−07 |
| R6 | 1.6138E−02 | −3.9081E−03 | 5.7498E−04 | −4.7216E−05 | 1.6627E−06 |
| R7 | 2.8264E−02 | −6.8089E−03 | 1.0053E−03 | −8.3561E−05 | 3.0004E−06 |
| R8 | 1.3861E−02 | −2.9310E−03 | 3.8346E−04 | −2.8361E−05 | 9.0649E−07 |
| R9 | 2.8491E−03 | −4.7970E−04 | 5.2545E−05 | −3.3801E−06 | 9.6225E−08 |
| R10 | 1.0606E−04 | 1.3418E−05 | −3.3575E−06 | 2.6693E−07 | −7.8093E−09 |
| R11 | 8.8162E−05 | 4.1742E−06 | −1.6136E−06 | 1.3444E−07 | −3.8487E−09 |
| R12 | 5.5458E−06 | 9.2168E−07 | −1.2143E−07 | 5.5811E−09 | −9.3054E−11 |
| R13 | −3.5185E−06 | 1.4533E−07 | −3.3636E−09 | 4.0689E−11 | −1.9677E−13 |
| R14 | −3.0375E−06 | 1.8514E−07 | −6.2876E−09 | 1.1236E−10 | −8.2178E−13 |
| R15 | −1.5287E−06 | 3.5655E−08 | −4.3662E−10 | 1.8144E−12 | 5.9533E−15 |
| R16 | 8.2013E−07 | −4.5255E−08 | 1.2434E−09 | −1.7212E−11 | 9.5633E−14 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 2.745 | | |
| P1R2 | 1 | 2.315 | | |
| P2R1 | 1 | 2.465 | | |
| P2R2 | 0 | | | |
| P3R1 | 1 | 1.965 | | |
| P3R2 | 1 | 2.055 | | |
| P4R1 | 2 | 0.465 | 2.295 | |
| P4R2 | 2 | 0.555 | 2.515 | |
| P5R1 | 1 | 0.695 | | |
| P5R2 | 1 | 2.635 | | |
| P6R1 | 3 | 0.655 | 1.025 | 2.945 |
| P6R2 | 2 | 2.915 | 3.595 | |
| P7R1 | 2 | 1.265 | 3.605 | |
| P7R2 | 2 | 1.605 | 5.175 | |
| P8R1 | 3 | 3.075 | 5.845 | 6.125 |
| P8R2 | 3 | 0.665 | 5.395 | 6.065 |

TABLE 12

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 1 | 2.235 |
| P3R2 | 0 | |
| P4R1 | 1 | 0.745 |
| P4R2 | 1 | 0.975 |
| P5R1 | 1 | 1.065 |
| P5R2 | 0 | |
| P6R1 | 0 | |
| P6R2 | 0 | |
| P7R1 | 1 | 2.255 |
| P7R2 | 1 | 2.785 |
| P8R1 | 0 | |
| P8R2 | 1 | 1.235 |

Figure 10:
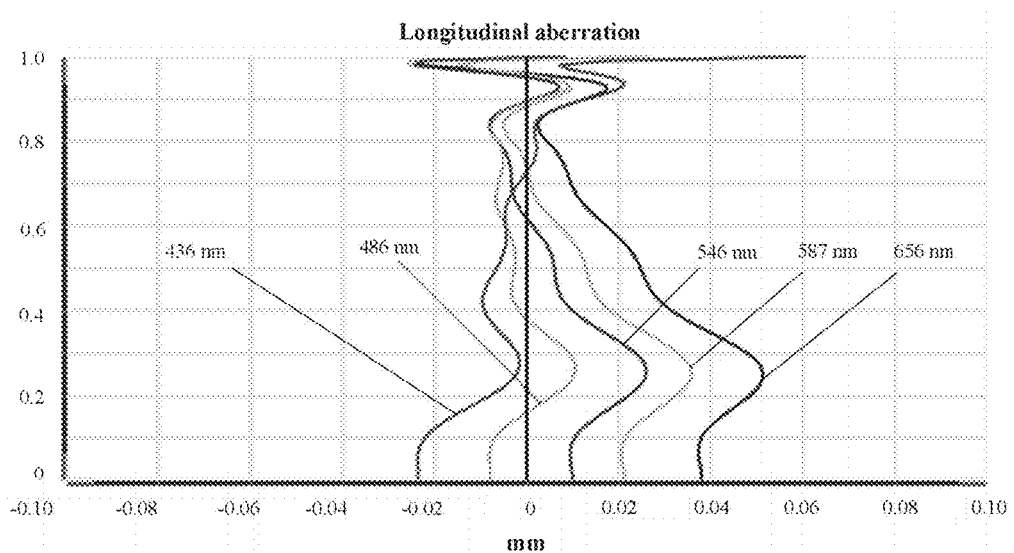
FIG. 10 is a schematic diagram of a longitudinal aberration of the camera optical lens shown in FIG. 9.
Figure 11:
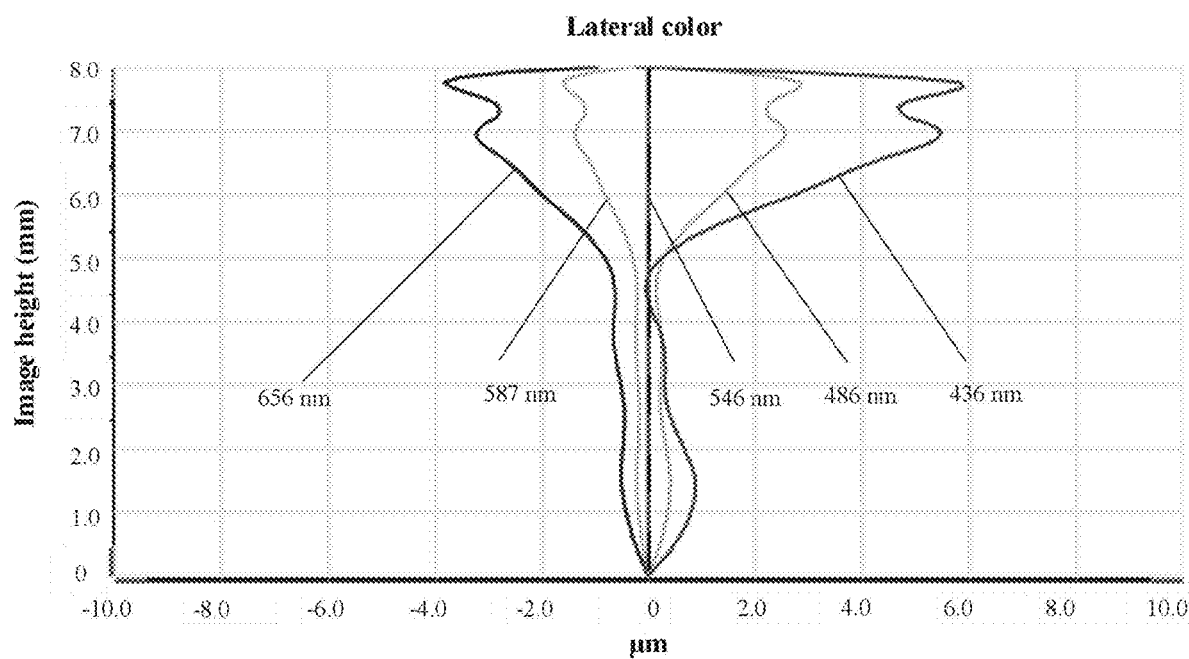
FIG. 11 is a schematic diagram of a lateral color of the camera optical lens shown in FIG. 9.
Figure 12:
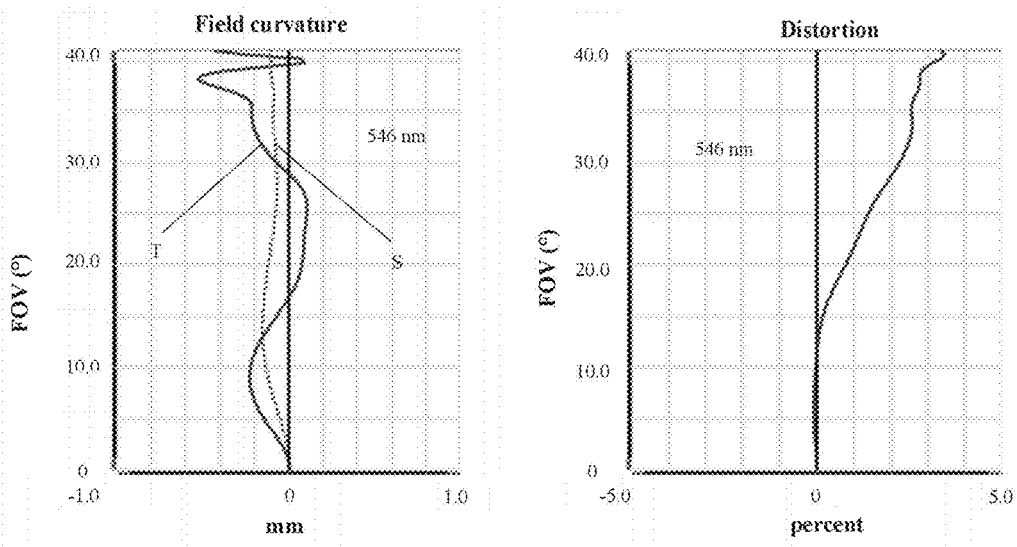
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 436 nm, 486 nm, 546 nm, 587 nm and 656 nm after passing the camera optical lens 30 according to Embodiment 3. FIG. 12 illustrates a field curvature and a distortion of light with a wavelength of 546 nm after passing the camera optical lens 30 according to Embodiment 3. A field curvature S in FIG. 12 is a field curvature in a sagittal direction, and T is a field curvature in a tangential direction.

As shown in Table 17, Embodiment 3 satisfies the above conditions.

In this embodiment, an entrance pupil diameter of the camera optical lens 30 is 5.575 mm, an image height of 1.0H is 8.000 mm, a FOV (field of view) in the diagonal direction is 80.00°. Thus, the camera optical lens 30 has a wide angle, ultra-thinness and large aperture. Its on-axis and off-axis aberrations are fully corrected, thereby achieving excellent optical characteristics.

Embodiment 4

Figure 13:
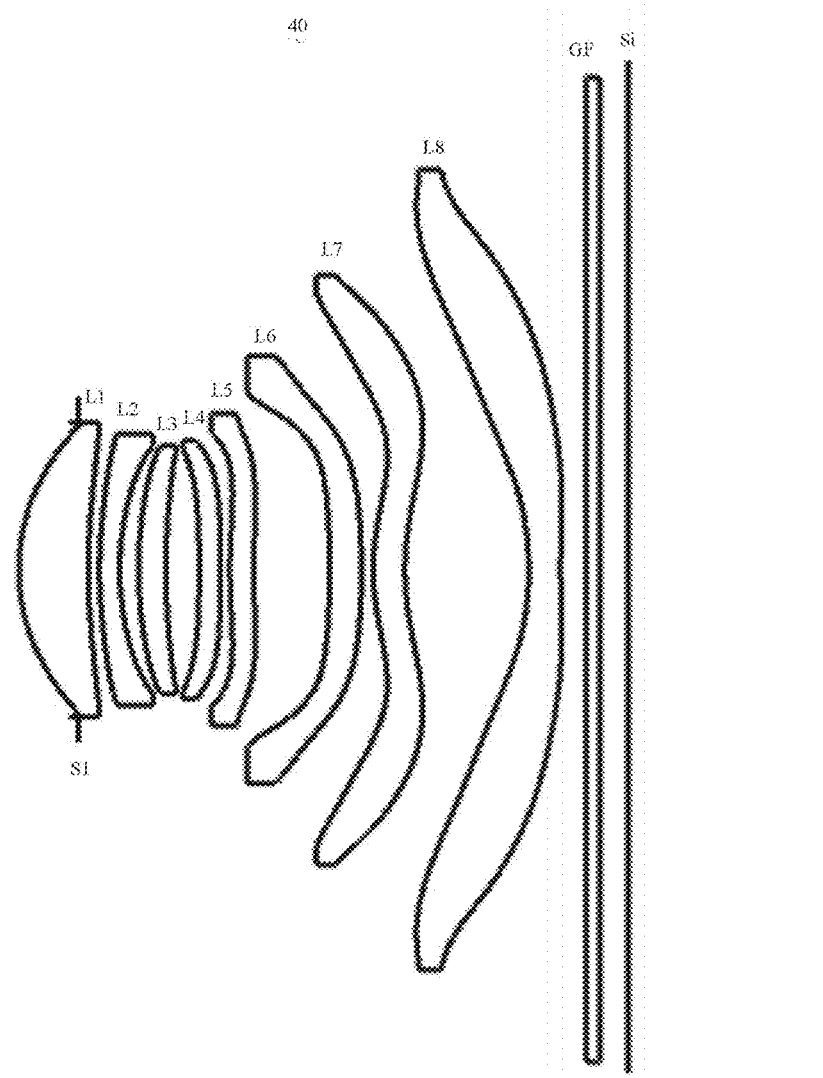
FIG. 13 is a schematic diagram of a structure of a camera optical lens according to Embodiment 4 of the present disclosure.

FIG. 13 is a schematic structural diagram of a camera optical lens 40 in Embodiment 4. Embodiment 4 is basically the same as Embodiment 1 and involves symbols in the following tables having the same meanings as Embodiment 1, so the same parts are not repeated here, and only the differences therebetween will be described in the following.

Table 13 and Table 14 show design data of a camera optical lens 40 in Embodiment 4 of the present disclosure.

Table 15 and Table 16 show design data inflexion points and arrest points of the respective lenses in the camera optical lens 40 according to Embodiment 4 of the present disclosure.

TABLE 13

|     | R        | d          | nd        | ν d      |
|-----|----------|------------|-----------|----------|
| S1  | ∞        | d0 = −0.932|           |          |
| R1  | 3.158    | d1 = 1.078 | nd1 1.5444| ν1 55.82 |
| R2  | 8.207    | d2 = 0.179 |           |          |
| R3  | 6.333    | d3 = 0.320 | nd2 1.6700| ν2 19.39 |
| R4  | 4.294    | d4 = 0.297 |           |          |
| R5  | 6.617    | d5 = 0.428 | nd3 1.5661| ν3 37.71 |
| R6  | 10.223   | d6 = 0.528 |           |          |
| R7  | −19.829  | d7 = 0.332 | nd4 1.6153| ν4 25.94 |
| R8  | −486.299 | d8 = 0.149 |           |          |
| R9  | 7.790    | d9 = 0.380 | nd5 1.6153| ν5 25.94 |
| R10 | 16.317   | d10 = 1.182|           |          |
| R11 | −10.828  | d11 = 0.500| nd6 1.5661| ν6 37.71 |
| R12 | −11.067  | d12 = 0.181|           |          |
| R13 | 3.441    | d13 = 0.500| nd7 1.5444| ν7 55.82 |
| R14 | 4.179    | d14 = 1.959|           |          |
| R15 | −5.195   | d15 = 0.500| nd8 1.5346| ν8 55.69 |
| R16 | 14.897   | d16 = 0.400|           |          |
| R15 | ∞        | d17 = 0.210| ndg 1.5168| νg 64.17 |
| R16 | ∞        | d18 = 0.447|           |          |

TABLE 14

| | Conic coefficient | Aspherical surface coefficients | | | |
|---|---|---|---|---|---|
| | k | A4 | A6 | A8 | A10 |
| R1  | −1.9243E−01 | 2.0721E−04  | 1.2332E−04  | −7.4416E−05 | 1.8774E−05  |
| R2  | −1.0000E+01 | −1.2059E−02 | 5.6721E−03  | −2.2942E−03 | 7.3709E−04  |
| R3  | −1.6000E+01 | −1.6302E−02 | 9.8558E−03  | −3.0320E−03 | 5.3761E−04  |
| R4  | −8.3274E+00 | 2.3440E−04  | 4.5670E−03  | 2.6934E−03  | −4.6042E−03 |
| R5  | 7.6130E+00  | −4.1697E−03 | −2.3380E−03 | 6.8860E−03  | −8.3698E−03 |
| R6  | 9.3645E+00  | −3.8225E−03 | 2.2526E−03  | −4.8854E−03 | 6.0441E−03  |
| R7  | −1.7349E+01 | −9.7463E−03 | 2.9532E−04  | 2.0319E−03  | −3.8421E−03 |
| R8  | 1.0000E+01  | −2.6763E−02 | 8.9146E−03  | −3.5892E−03 | 7.3186E−04  |
| R9  | −4.6986E+00 | −2.5789E−02 | −6.8002E−04 | 6.0479E−03  | −5.5889E−03 |
| R10 | −3.4297E+01 | −8.5296E−03 | −5.5580E−03 | 3.8641E−03  | −1.6135E−03 |
| R11 | 7.0939E+00  | 1.4527E−02  | −7.1017E−03 | −1.3174E−03 | 1.9697E−03  |
| R12 | 2.8036E+00  | 9.0469E−04  | −3.1138E−03 | −7.6266E−05 | 2.3032E−04  |
| R13 | −5.2676E+00 | −1.5004E−02 | 1.3060E−03  | −8.8306E−04 | 2.1455E−04  |
| R14 | −1.1494E+01 | 4.9207E−03  | −4.2433E−03 | 7.1870E−04  | −6.4698E−05 |
| R15 | −1.8923E+01 | −2.9950E−02 | 7.0805E−03  | −8.4895E−04 | 6.0685E−05  |
| R16 | −2.4473E+01 | −1.9888E−02 | 3.4259E−03  | −3.5216E−04 | 2.2538E−05  |

| | Aspherical surface coefficients | | | | |
|---|---|---|---|---|---|
| | A12 | A14 | A16 | A18 | A20 |
| R1  | −2.7224E−06 | 0.0000E+00  | 0.0000E+00  | 0.0000E+00  | 0.0000E+00  |
| R2  | −1.7193E−04 | 2.6237E−05  | −2.2964E−06 | 8.6070E−08  | 0.0000E+00  |
| R3  | −2.8029E−05 | −5.3266E−06 | 6.8023E−07  | 0.0000E+00  | 0.0000E+00  |
| R4  | 2.9577E−03  | −1.1008E−03 | 2.5179E−04  | −3.3100E−05 | 1.9268E−06  |
| R5  | 5.6443E−03  | −2.2829E−03 | 5.4992E−04  | −7.2126E−05 | 3.9348E−06  |
| R6  | −4.6352E−03 | 2.1637E−03  | −5.9775E−04 | 9.0647E−05  | −5.8058E−06 |
| R7  | 2.7994E−03  | −1.1707E−03 | 2.8660E−04  | −3.7280E−05 | 1.9743E−06  |
| R8  | −1.8224E−04 | 4.4958E−05  | −4.5510E−06 | 0.0000E+00  | 0.0000E+00  |
| R9  | 2.8064E−03  | −9.0413E−04 | 1.7896E−04  | −1.9276E−05 | 8.4683E−07  |
| R10 | 4.1253E−04  | −7.2383E−05 | 8.7535E−06  | −5.9285E−07 | 1.5070E−08  |
| R11 | −9.1798E−04 | 2.3531E−04  | −3.4819E−05 | 2.7576E−06  | −8.9498E−08 |
| R12 | −7.4600E−05 | 1.3292E−05  | −1.3134E−06 | 6.6861E−08  | −1.3745E−09 |
| R13 | −2.4530E−05 | 1.5624E−06  | −5.7359E−08 | 1.1406E−09  | −9.5401E−12 |
| R14 | 2.8527E−06  | −5.9294E−09 | −4.9482E−09 | 1.8870E−10  | −2.2311E−12 |
| R15 | −2.7395E−06 | 7.9067E−08  | −1.4178E−09 | 1.4416E−11  | −6.3626E−14 |
| R16 | −9.2228E−07 | 2.3995E−08  | −3.8283E−10 | 3.4278E−12  | −1.3331E−14 |

TABLE 15

| | Number(s) of inflexion points | Inflexion point position 1 | Inflexion point position 2 | Inflexion point position 3 | Inflexion point position 4 |
|---|---|---|---|---|---|
| P1R1 | 1 | 2.325 |       |       |       |
| P1R2 | 1 | 1.855 |       |       |       |
| P2R1 | 0 |       |       |       |       |
| P2R2 | 0 |       |       |       |       |
| P3R1 | 0 |       |       |       |       |
| P3R2 | 0 |       |       |       |       |
| P4R1 | 0 |       |       |       |       |
| P4R2 | 0 |       |       |       |       |
| P5R1 | 1 | 0.665 |       |       |       |
| P5R2 | 2 | 0.635 | 2.175 |       |       |
| P6R1 | 1 | 2.555 |       |       |       |
| P6R2 | 2 | 2.625 | 3.045 |       |       |
| P7R1 | 2 | 1.025 | 3.845 |       |       |
| P7R2 | 2 | 1.235 | 4.425 |       |       |
| P8R1 | 4 | 2.095 | 2.925 | 3.905 | 6.095 |
| P8R2 | 3 | 0.555 | 5.325 | 6.235 |       |

TABLE 16

|  | Number of arrest points | Arrest point position 1 |
|---|---|---|
| P1R1 | 0 |  |
| P1R2 | 0 |  |
| P2R1 | 0 |  |
| P2R2 | 0 |  |
| P3R1 | 0 |  |
| P3R2 | 0 |  |
| P4R1 | 0 |  |
| P4R2 | 0 |  |
| P5R1 | 1 | 1.185 |
| P5R2 | 1 | 1.075 |
| P6R1 | 0 |  |
| P6R2 | 0 |  |
| P7R1 | 1 | 1.795 |
| P7R2 | 1 | 2.215 |
| P8R1 | 1 | 5.745 |
| P8R2 | 1 | 1.025 |

Figure 14:
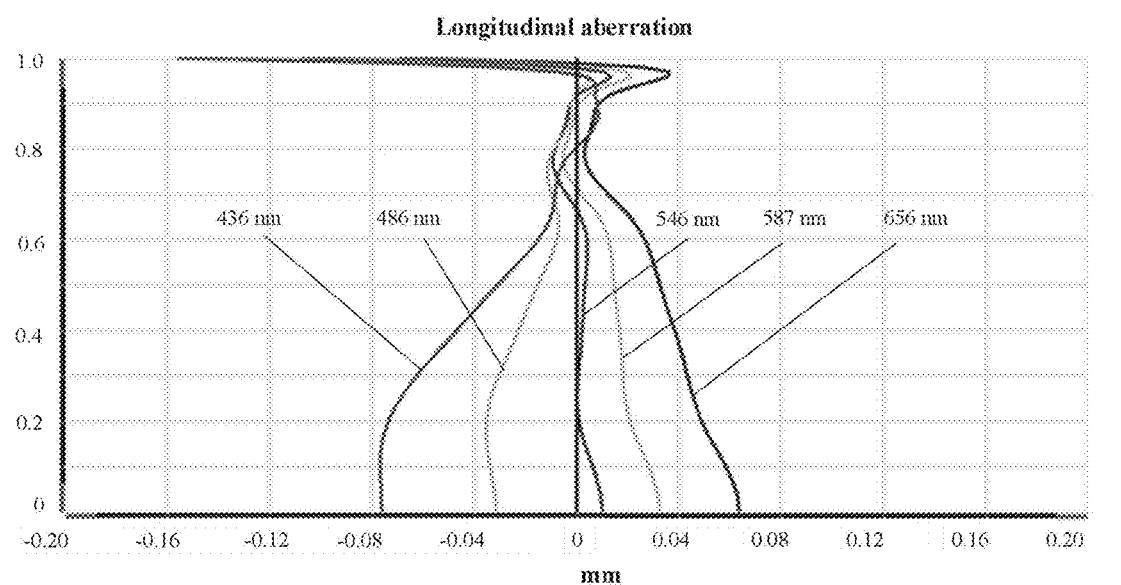
FIG. 14 is a schematic diagram of a longitudinal aberration of the camera optical lens shown in FIG. 13.
Figure 15:
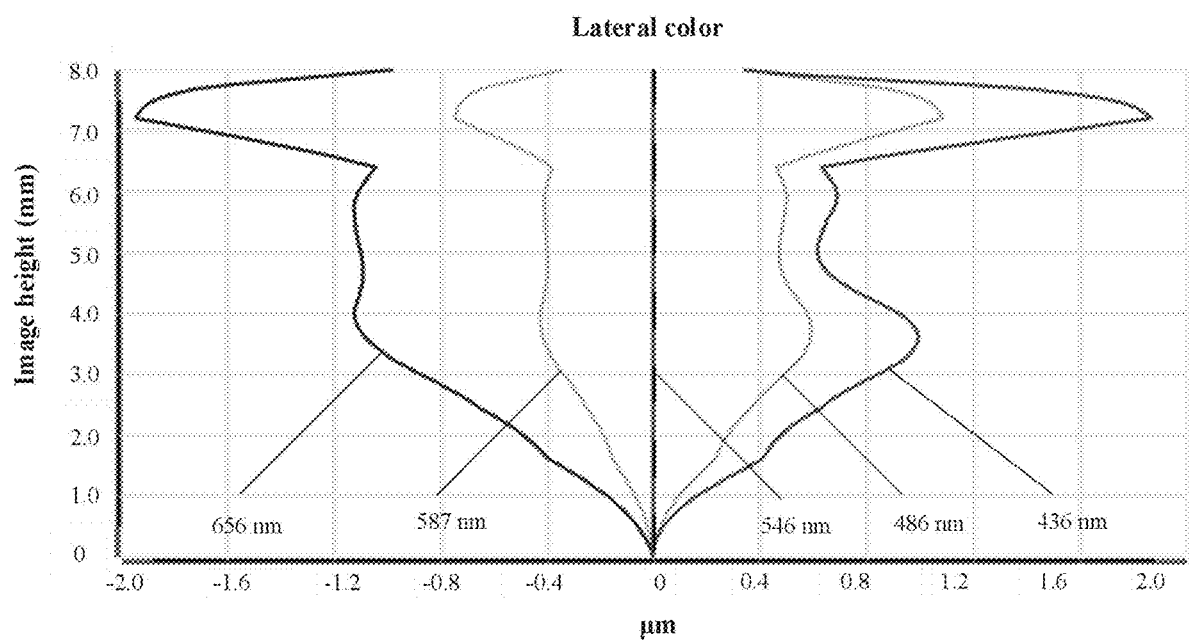
FIG. 15 is a schematic diagram of a lateral color of the camera optical lens shown in FIG. 13.
Figure 16:
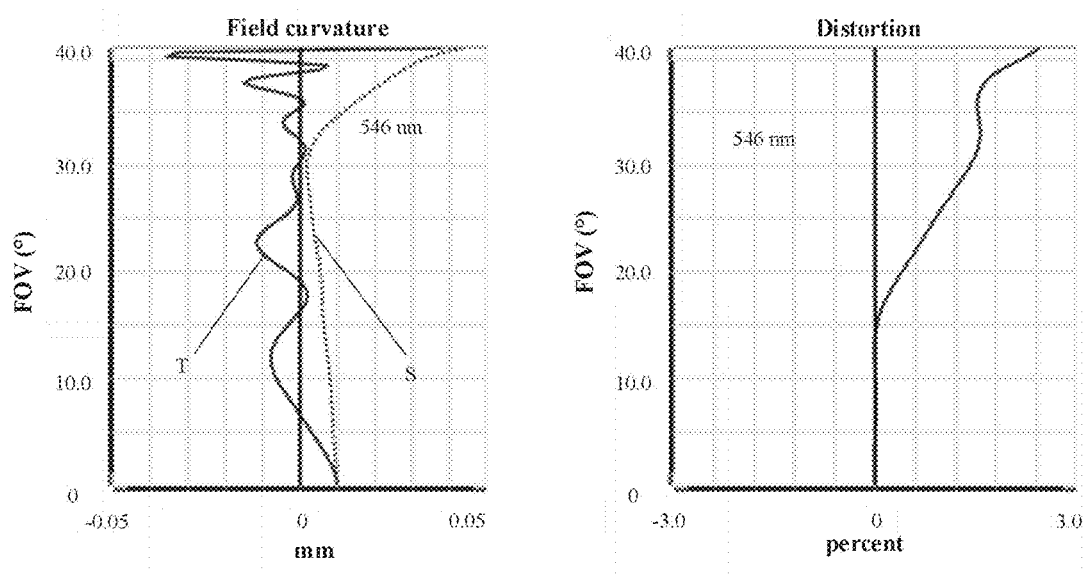
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 436 nm, 486 nm, 546 nm, 587 nm and 656 nm after passing the camera optical lens 30 according to Embodiment 4. FIG. 16 illustrates a field curvature and a distortion of light with a wavelength of 546 nm after passing the camera optical lens 40 according to Embodiment 4. A field curvature S in FIG. 16 is a field curvature in a sagittal direction, and T is a field curvature in a tangential direction.

As shown in Table 17, Embodiment 4 satisfies the above conditions.

In this embodiment, an entrance pupil diameter of the camera optical lens 40 is 4.664 mm, an image height of 1.0H is 8.000 mm, a FOV (field of view) in the diagonal direction is 80.00°. Thus, the camera optical lens 30 has a wide angle, ultra-thinness and large aperture. Its on-axis and off-axis aberrations are fully corrected, thereby achieving excellent optical characteristics.

The following table 17 lists the values of some conditions in Embodiment 1, Embodiment 2, Embodiment 3 and Embodiment 4 and the values of other related parameters according to the above conditions.

TABLE 17

|  | Embodiment 1 | Embodiment 2 | Embodiment 3 | Embodiment 4 |
|---|---|---|---|---|
| f1/f | 0.71 | 0.80 | 0.92 | 0.97 |
| f4/f | −19.30 | −14.22 | −6.25 | −3.70 |
| f5/f | 4.46 | 3.63 | 2.96 | 2.62 |
| f | 8.998 | 8.921 | 8.921 | 9.001 |
| f1 | 6.424 | 7.108 | 8.200 | 8.730 |
| f2 | −12.602 | −18.769 | −30.112 | −20.989 |
| f3 | 69.521 | 229.920 | 361.351 | 31.575 |
| f4 | −173.642 | −126.877 | −55.771 | −33.301 |
| f5 | 40.129 | 32.395 | 26.388 | 23.604 |
| f6 | −79.263 | −22.283 | −21.637 | −3709.083 |
| f7 | 24.638 | 13.384 | 11.741 | 28.747 |
| f8 | −7.029 | −7.327 | −7.532 | −7.112 |
| f12 | 10.720 | 10.116 | 10.275 | 12.975 |
| FNO | 1.93 | 1.93 | 1.60 | 1.93 |

FNO is an F number of the camera optical lens.

The above are only embodiments of the present disclosure. It shall be indicated that those of ordinary skill in the art can make improvements without departing from the creative concept of the present disclosure, and these belong to the protection scope of the present disclosure.

What is claimed is:

1. A camera optical lens comprising, from an object side to an image side:
   a first lens having a positive refractive power;
   a second lens having a negative refractive power;
   a third lens having a positive refractive power;
   a fourth lens having a negative refractive power;
   a fifth lens having a positive refractive power;
   a sixth lens having a negative refractive power;
   a seventh lens having a positive refractive power; and
   a eighth lens having a negative refractive power;
   wherein the camera optical lens satisfies the following conditions:

$0.70 \leq f1/f \leq 1.00$;

$-20.00 \leq f4/f \leq -3.50$; and $2.30 \leq f5/f \leq 4.50$;

where
   f denotes a focal length of the camera optical lens;
   f1 denotes a focal length of the first lens;
   f4 denotes a focal length of the fourth lens; and
   f5 denotes a focal length of the fifth lens.

2. The camera optical lens according to claim 1 further satisfying the following condition:

$(R11+R12)/(R11-R12) \leq -1.00$;

where
   R11 denotes a curvature radius of an object-side surface of the sixth lens; and
   R12 denotes a curvature radius of an image-side surface of the sixth lens.

3. The camera optical lens according to claim 1 further satisfying the following condition:

$1.50 \leq d10/d9 \leq 3.30$;

where
   d9 denotes an on-axis thickness of the fifth lens; and
   d10 denotes an on-axis distance from an image-side surface of the fifth lens to an object-side surface of the sixth lens.

4. The camera optical lens according to claim 1 further satisfying the following conditions:

$0.06 \leq d1/TTL \leq 0.24$; and $-4.50 \leq (R1+R2)/(R1-R2) \leq -0.93$;

where
   TTL denotes a total optical length from an object-side surface of the first lens to an image surface of the camera optical lens along an optical axis;
   d1 denotes an on-axis thickness of the first lens;
   R1 denotes a curvature radius of an object-side surface of the first lens; and
   R2 denotes a curvature radius of an image-side surface of the first lens.

5. The camera optical lens according to claim 1 further satisfying the following conditions:

$0.01 \leq d3/TTL \leq 0.05$;

$-6.75 \leq f2/f \leq -0.93$; and $0.96 \leq (R3+R4)/(R3-R4) \leq 7.82$;

where
   f2 denotes a focal length of the second lens;
   TTL denotes a total optical length from an object-side surface of the first lens to an image surface of the camera optical lens along an optical axis;

d3 denotes an on-axis thickness of the second lens;
R3 denotes a curvature radius of an object-side surface of the second lens; and
R4 denotes a curvature radius of an image-side surface of the second lens.

6. The camera optical lens according to claim 1 further satisfying the following conditions:

$$0.02 \leq d5/TTL \leq 0.07;$$

$$1.75 \leq f3/f \leq 60.76; \text{ and}$$

$$-21.79 \leq (R5+R6)/(R5-R6) \leq 7.89;$$

where f3 denotes a focal length of the third lens;
TTL denotes a total optical length from an object-side surface of the first lens to an image surface of the camera optical lens along an optical axis;
d5 denotes an on-axis thickness of the third lens;
R5 denotes a curvature radius of an object-side surface of the third lens; and
R6 denotes a curvature radius of an image-side surface of the third lens.

7. The camera optical lens according to claim 1 further satisfying the following conditions:

$$0.01 \leq d7/TTL \leq 0.07; \text{ and}$$

$$-2.17 \leq (R7+R8)/(R7-R8) \leq 16.70;$$

where

TTL denotes a total optical length from an object-side surface of the first lens to an image surface of the camera optical lens along an optical axis;
d7 denotes an on-axis thickness of the fourth lens;
R7 denotes a curvature radius of an object-side surface of the fourth lens; and
R8 denotes a curvature radius of an image-side surface of the fourth lens.

8. The camera optical lens according to claim 1 further satisfying the following conditions:

$$0.02 \leq d9/TTL \leq 0.07; \text{ and}$$

$$-5.65 \leq (R9+R10)/(R9-R10) \leq 0.93;$$

where

TTL denotes a total optical length from an object-side surface of the first lens to an image surface of the camera optical lens along an optical axis;
d9 denotes an on-axis thickness of the fifth lens;
R9 denotes a curvature radius of an object-side surface of the fifth lens; and
R10 denotes a curvature radius of an image-side surface of the fifth lens.

9. The camera optical lens according to claim 1 further satisfying the following conditions:

$$0.02 \leq d11/TTL \leq 0.08; \text{ and}$$

$$-824.15 \leq f6/f \leq -1.62;$$

where f6 denotes a focal length of the sixth lens;
TTL denotes a total optical length from an object-side surface of the first lens to an image surface of the camera optical lens along an optical axis;
d11 denotes an on-axis thickness of the sixth lens.

10. The camera optical lens according to claim 1 further satisfying the following conditions:

$$0.03 \leq d13/TTL \leq 0.11;$$

$$0.66 \leq f7/f \leq 4.79; \text{ and}$$

$$-20.65 \leq (R13+R14)/(R13-R14) \leq -2.69;$$

where f7 denotes a focal length of the seventh lens;
TTL denotes a total optical length from an object-side surface of the first lens to an image surface of the camera optical lens along an optical axis;
d13 denotes an on-axis thickness of the seventh lens;
R13 denotes a curvature radius of an object-side surface of the seventh lens; and
R14 denotes a curvature radius of an image-side surface of the seventh lens.

11. The camera optical lens according to claim 1 further satisfying the following conditions:

$$0.02 \leq d15/TTL \leq 0.13;$$

$$-1.69 \leq f8/f \leq -0.52; \text{ and}$$

$$-0.97 \leq (R15+R16)/(R15-R16) \leq -0.21;$$

where f8 denotes a focal length of the eighth lens;
d15 denotes an on-axis thickness of the eighth lens;
R15 denotes a curvature radius of an object-side surface of the eighth lens; and
R16 denotes a curvature radius of an image-side surface of the eighth lens.

* * * * *